United States Patent

Shimasaki et al.

(10) Patent No.: US 9,674,058 B2
(45) Date of Patent: Jun. 6, 2017

(54) TIME SERIES DATA PROCESSING DEVICE, TIME SERIES DATA PROCESSING METHOD, AND COMPUTER-READABLE RECORDING MEDIUM STORING TIME SERIES DATA PROCESSING PROGRAM

(75) Inventors: Keita Shimasaki, Tokyo (JP); Miyako Shimasaki, legal representative, Waki (JP); Naohiro Suzuki, Tokyo (JP); Shuntaro Hitomi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 516 days.

(21) Appl. No.: 14/351,824

(22) PCT Filed: Nov. 7, 2011

(86) PCT No.: PCT/JP2011/075588
§ 371 (c)(1),
(2), (4) Date: Jun. 30, 2014

(87) PCT Pub. No.: WO2013/069078
PCT Pub. Date: May 16, 2013

(65) Prior Publication Data
US 2014/0379904 A1 Dec. 25, 2014

(51) Int. Cl.
*H04L 12/26* (2006.01)
*G05B 23/02* (2006.01)
(Continued)

(52) U.S. Cl.
CPC ...... *H04L 43/0805* (2013.01); *G05B 23/0221* (2013.01); *G06F 17/30303* (2013.01);
(Continued)

(58) Field of Classification Search
CPC ...... H04L 41/06–41/0627; H04L 41/08; H04L 41/0805; H04L 41/0852; G06F 17/30477;
(Continued)

(56) References Cited

U.S. PATENT DOCUMENTS 7,437,266 B2    10/2008   Ueno et al.
7,831,532 B2 *   11/2010   Horvitz ............... G01C 21/36
                                                      706/45
(Continued)

FOREIGN PATENT DOCUMENTS

JP    2007-066058 A    3/2007
JP    2009-282926 A    12/2009

OTHER PUBLICATIONS

International Search Report on application PCT/JP2011/075588 mailed Feb. 7, 2012; 2 pages.

*Primary Examiner* — Patrice Winder
(74) *Attorney, Agent, or Firm* — Foley & Lardner LLP

(57) ABSTRACT

A time series data processing device for processing time series data that is a sequence of data received from a system that is a processing target over time includes a time series data search processing unit that receives, for details of the time series data and occurrence time information, a time series data search condition including events of a plurality of the time series data and an interval condition that is a condition of time intervals of the events occurring, and changes the interval condition using an allowable time lag that is allowable time of a set time lag in a transmission source of the time series data to thereby reflect the set time lag in the time series data search condition; and a data monitoring unit that monitors the time series data received from the system that is the processing target, using the time series data search condition changed by the time series data search processing unit.

13 Claims, 22 Drawing Sheets

(51) Int. Cl.
*G06F 17/30* (2006.01)
*G06Q 10/10* (2012.01)

(52) U.S. Cl.
CPC ....... *G06F 17/30424* (2013.01); *G06Q 10/10* (2013.01); *H04L 43/0852* (2013.01)

(58) Field of Classification Search
CPC .... G06F 17/30516–17/30522; G06F 17/3048; G06F 17/30303; G06F 17/30424; G05B 23/0224; G06Q 10/10
See application file for complete search history.

(56) References Cited

U.S. PATENT DOCUMENTS

| | | | | |
|---|---|---|---|---|
| 7,849,227 | B2* | 12/2010 | Kashiyama | G06F 17/30477 705/1.1 |
| 8,099,452 | B2* | 1/2012 | Chkodrov | G06F 1/12 709/201 |
| 8,315,990 | B2* | 11/2012 | Barga | G06F 11/0721 707/690 |
| 8,413,169 | B2* | 4/2013 | Grabs | G06F 9/542 719/318 |
| 2006/0294221 | A1* | 12/2006 | Graupner | H04L 43/067 709/224 |
| 2007/0003023 | A1* | 1/2007 | Rolia | H04L 12/2602 379/32.01 |
| 2009/0112803 | A1* | 4/2009 | Srinivasan | G06F 17/30964 |
| 2009/0125550 | A1* | 5/2009 | Barga | G06F 9/542 |
| 2009/0292662 | A1* | 11/2009 | Ueno | G06F 17/18 706/46 |
| 2011/0016160 | A1* | 1/2011 | Zhang | G06F 17/30386 707/805 |

* cited by examiner

| ATTRIBUTE | TIME AND DATE | VALUE |
|---|---|---|
| PRESSURE SENSOR | 2011-07-01 07:00:00, | 15.2 |
| TEMPERATURE SENSOR, | 2011-07-01 07:00:00, | 24.3 |
| OPERATE, | 2011-07-01 07:00:00, | MANUAL START |
| PRESSURE SENSOR, | 2011-07-01 07:00:01, | 16.2 |
| TEMPERATURE SENSOR, | 2011-07-01 07:00:01, | 25.3 |
| MAINTENANCE, | 2011-07-01 07:01:00, | COMPLETE |
| PRESSURE SENSOR, | 2011-07-01 07:59:00, | 62.4 |
| OPERATE, | 2011-07-10 17:12:00, | STOP |
| MAINTENANCE, | 2011-07-10 21:00:00, | START |
| MAINTENANCE, | 2011-07-11 08:00:00, | COMPLETE |
| OPERATE, | 2011-07-11 08:03:00, | MANUAL START |
| PRESSURE SENSOR, | 2011-07-11 08:30:00, | 15.4 |
| PRESSURE SENSOR, | 2011-07-11 08:30:01, | 15.8 |
| PRESSURE SENSOR, | 2011-07-11 09:23:00, | 51.7 |

FIG. 2A

ALLOWABLE TIME LAG TIME TABLE 1240

AGGREGATED DATA TABLE 210

MONITORING QUERY TABLE 1230

| MONITORING QUERY | QUERY TYPE |
|---|---|
| MAINTENANCE —ZERO TO SEVEN MINUTES INCLUSIVE→ MANUAL OPERATION —28 MINUTES TO TWO HOURS TWO MINUTES INCLUSIVE→ PRESSURE SENSOR EXCEEDS THRESHOLD VALUE OF 50 | 1 |
| MANUAL OPERATION —ZERO TO TWO MINUTES INCLUSIVE→ MAINTENANCE —28 MINUTES TO TWO HOURS TWO MINUTES INCLUSIVE→ PRESSURE SENSOR EXCEEDS THRESHOLD VALUE OF 50 | 1 |
| ... | 2 |

ALLOWABLE TIME LAG TIME TABLE 1240

| SENSOR NAME | 2011/7/1 00:00:00 | 2011/8/1 00:00:00 | ... |
|---|---|---|---|
| SENSOR 1 | 1.0(MIN) | 1.1(MIN) | ... |
| SENSOR 2 | 1.2(MIN) | 0.8(MIN) | ... |
| ... | ... | ... | ... |

FIG. 14

MONITORING QUERY IN UNITS TABLE 1230A

| MONITORING QUERY 1231 | QUERY TYPE 1232 | MONITORING UNITS 1233 |
|---|---|---|
| MAINTENANCE —ZERO TO SEVEN MINUTES INCLUSIVE→ MANUAL OPERATION —28 MINUTES TO TWO HOURS TWO MINUTES INCLUSIVE→ PRESSURE SENSOR EXCEEDS THRESHOLD VALUE OF 50 | 1 | SINGLE DAY WINDOW |
| MANUAL OPERATION —ZERO TO TWO MINUTES INCLUSIVE→ MAINTENANCE —28 MINUTES TO TWO HOURS TWO MINUTES INCLUSIVE→ PRESSURE SENSOR EXCEEDS THRESHOLD VALUE OF 50 | 1 | SINGLE DAY WINDOW |
| ... | 2 | MANUFACTURING LOT |

FIG. 17

TRANSITION PROBABILITY TABLE 1250

| MONITORING QUERY | FIRST PATTERN | | | SECOND PATTERN | | |
|---|---|---|---|---|---|---|
| | FIRST ELEMENT DETECTION FREQUENCY | SECOND ELEMENT TRANSITION FREQUENCY | TRANSITION PROBABILITY | FIRST ELEMENT DETECTION FREQUENCY | SECOND ELEMENT TRANSITION FREQUENCY | TRANSITION PROBABILITY |
| MAINTENANCE COMPLETE $\xrightarrow{\text{ZERO TO SEVEN MINUTES INCLUSIVE}}$ START MANUAL OPERATION $\xrightarrow{\text{28 MINUTES TO TWO HOURS TWO MINUTES INCLUSIVE}}$ PRESSURE SENSOR EXCEEDS THRESHOLD VALUE OF 50 | 200 | 100 | 0.5 | 100 | 30 | 0.3 |
| START MANUAL OPERATION $\xrightarrow{\text{ZERO TO TWO MINUTES INCLUSIVE}}$ MAINTENANCE COMPLETE $\xrightarrow{\text{28 MINUTES TO TWO HOURS TWO MINUTES INCLUSIVE}}$ PRESSURE SENSOR EXCEEDS THRESHOLD VALUE OF 50 | 40 | 16 | 0.25 | 16 | 12 | 0.75 |

TIME SERIES DATA PROCESSING DEVICE, TIME SERIES DATA PROCESSING METHOD, AND COMPUTER-READABLE RECORDING MEDIUM STORING TIME SERIES DATA PROCESSING PROGRAM

TECHNICAL FIELD

The present invention relates to a time series data processing device, a time series data processing method, and a computer-readable recording medium storing a time series data processing program.

BACKGROUND ART

Recent developments in sensing technology have allowed acquisition of a wide variety of data from the real world. And attempts are being made to put various time series data, which is data acquired in chronological order, from the sensing target to practical use. For example, turbine operation control of power plants and the like, quality control in manufacturing plants of semiconductors and the like, and facility operating status monitoring can be carried out by analyzing time series data acquired from multiple sensors.

Technologies utilizing collection and analysis of such time series data are disclosed in, for example, PTL 1 and PTL 2. Both PTL 1 and PTL 2 relate to a time series data analysis device and the like. PTL 1 is directed to extracting from time series data a pattern indicating transition of compound factors, and proposes a configuration for selecting the transition of the pattern over a certain time lag range. Further, PTL 2 discloses a configuration for event prediction using a degree of change in the time series of the event occurring for the prediction target and by creating a classification model that can estimate the time required until the change.

CITATION LIST

Patent Literature

[PTL 1] Japanese Patent Application Laid-open Publication No. 2007-66058
[PTL 2] Japanese Patent Application Laid-open Publication No. 2009-282926

SUMMARY OF INVENTION

Technical Problem

However, with the configurations disclosed in PTL 1 or PTL 2, there may be issues such as of problems in handling error and the like of time series analysis results due to the time set to the sensor that is the transmission source of the time series data being off. There is a wide variety of multiple sensors equipped to the system as targets of sensing, and even though each sensor has its own time information, there exists a lag between the time information imparted to the time series data transmitted by each sensor since time information is usually not managed by a master clock or the like. Consider a case where time series data is received in order starting from a first sensor and then a second sensor, and receiving the time series data in this order at predetermined time intervals is determined to be normal. In this case, if the time series data of the first sensor is received prior to the time series data of the second sensor before a predetermined time has elapsed or the time series data of the first sensor is received after the time series data of the second sensor due to the time information of the first sensor running slower than the time information of the second sensor, an incorrect judgment will be made that the system malfunctioning even though the system is actually running normally. For this reason, there is a possibility that loss of time due to stopping of the system operation or monetary loss will be incurred.

With regard to this point, neither PTL 1 nor PTL 2 take into consideration the time lag of the sensors that transmit the time series data. Therefore, the technologies disclosed in PTL 1 and PTL 2 would seem to be incapable of detecting a case where time series data is acquired outside the predetermined time interval due to a time lag, or a pattern in which the sequence of time series data is reversed.

The present invention has been made in view of such circumstances, and has as its objective to provide a time series data processing device, a time series data processing method, and a computer-readable recording medium storing a time series data processing program, which are capable of appropriately analyzing time series data received from a plurality of sensors provided to a system taking into consideration the lag existing between the times set to the sensors.

Solution to Problem

One aspect of the present invention to achieve the foregoing objective is a time series data processing device for processing time series data, which is a sequence of data points received from a processing target system in chronological order, including a time series data search processing unit that receives, as details of the time series data and occurrence time information, a time series data search condition including events of a plurality of the time series data and an interval condition that is a condition on time intervals of the events occurring, and changes the interval condition using an allowable time lag that is allowable time of a set time lag in a transmission source of the time series data to thereby reflect the set time lag to the time series data search condition, and a data monitoring unit that monitors the time series data received from the system that is the processing target, using the time series data search condition changed by the time series data search processing unit.

Advantageous Effects of Invention

The present invention can provide a time series data processing device, a time series data processing method, and a computer-readable recording medium storing a time series data processing program that can appropriately analyze time series data received from a plurality of transmission sources provided to a system while taking into consideration the lag existing between the times set to the transmission sources.

BRIEF DESCRIPTION OF DRAWINGS

FIG. 2A is a diagram illustrating an example of time series data.

FIG. 9 is a diagram illustrating a configuration example of the monitoring query table 1230 of embodiment 1.

FIG. 14 is a diagram illustrating a configuration example of an allowable time lag time table 1240 of embodiment 2.

FIG. 17 is a diagram illustrating a configuration example of monitoring query in units table 1230 in embodiment 2.

FIG. 20 is a diagram illustrating a configuration example of transition probability table 1250 of embodiment 3.

DESCRIPTION OF EMBODIMENTS

A detailed description of embodiments of the present invention is given below with reference to the drawings.

Embodiment 1

Figure 1:
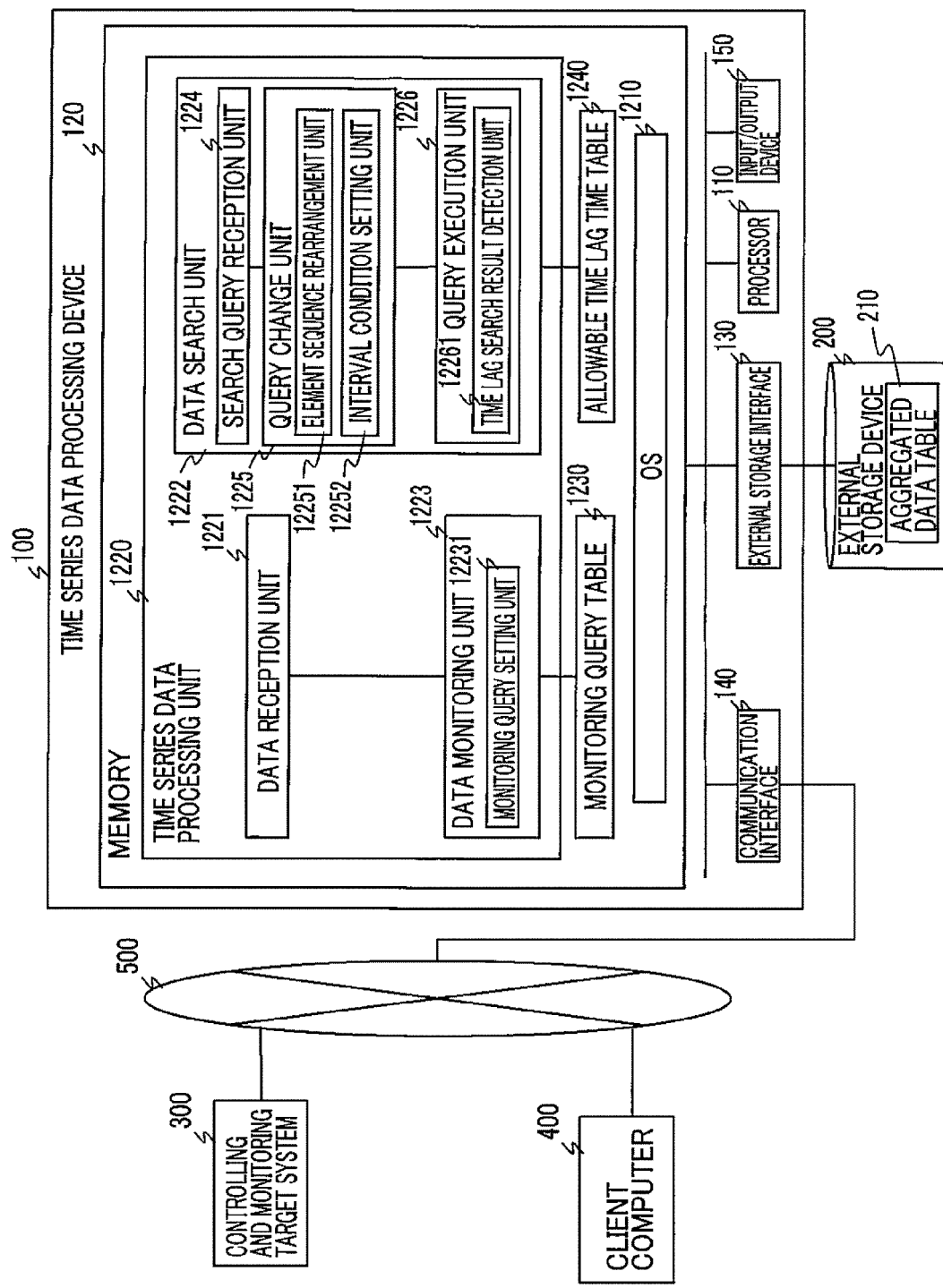
FIG. 1 is a diagram illustrating a configuration of a time series data processing device 100 of embodiment 1 in the present invention.

First, a description of a first embodiment according to the present invention is given. FIG. 1 shows a diagram illustrating an overall configuration example of the data processing system 1 including a time series data processing device 100 of the present embodiment. The data processing system 1 example shown in FIG. 1 includes a time series data processing device 100, an external storage device 200 and a client computer 400. The time series data processing device 100 and the client computer 400 are communicably coupled over the communication network 500. A controlling and monitoring target system 300 is the transmission source of time series data processed by the data processing system 1 and can be various systems such as an engine control system provided with a wide variety of sensors, a control system such as of a turbine control system, a production management system such as a semiconductor manufacturing plant, a chemical plant, and the like. The time series data processing device 100 acquires various time series data from the controlling and monitoring target system 300 over the communication network 500, and serves to function for monitoring the operating statuses of the controlling and monitoring target system 300 based on the acquired data.

First, a description of the hardware configuration of the data processing system 1 is given with reference to FIG. 1. The time series data processing device 100 is configured as an ordinary computer and includes a processor 110, a memory 120, an external storage interface 130, and a communication interface 140 and an input/output device 150. The processor 110 is configured with, for example, a Central Processing Unit (CPU), Micro-Processing Unit (MPU), and the like. The memory 120 is, for example, a Random Access Memory (RAM) or a Read Only Memory (ROM) and provides a temporary storage area for storing various computer programs (hereinafter "programs") executed by the processor 110 and data such as parameter data, tables, and the like used by the programs.

The external storage interface 130 is an interface circuit for implementing data input and output to and from the external storage device 200 to be described later, and can be selected as appropriate depending on the type of the external storage device 200. A Universal Serial Bus (USB), the iSCSI interface circuit, and the like, for example, can be used as the external storage interface 130. The communication interface 140 is an interface circuit for performing data communication with the communication network 500 and is selected as appropriate depending on the type of the communication network 500. For example, when the communication network 500 is a Local Area Network (LAN), a Network Interface Card (NIC) is used as the communication interface 140.

The input/output device 150 includes a data input/output device used in an ordinary computer. The input/output device 150 can include appropriate devices selected from among input devices such as, for example, a keyboard, a mouse, a touch screen, and a pen tablet, and output devices such as a display monitor and a printer.

The communication network 500 is, as mentioned above, a data transmission link for transmitting time series data from the controlling and monitoring target system 300 that is the target of controlling and monitoring by the data processing system 1 to the time series data processing device 100, and can be configured with, for example, a LAN, or with other types of networks. The communication network 500 is also utilized for data transmission from the time series data processing device 100 to the controlling and monitoring target system 300, and as a data transmission link between the later-described client computer 400 and the time series data processing device 100.

The client computer 400 is configured as an ordinary computer and can perform data communication between the time series data processing device 100 and the controlling and monitoring target system 300 over the communication network 500. Applications such as a browser that becomes the data input/output interface with, for example, the time series data processing device 100, operate on the client computer 400, and the client computer 400 functions to input the later-described search query to the time series data processing device 100, and receive and output processing result data obtained at the time series data processing device 100.

Next, a description of the time series data processing device 100 is given. The functions of the time series data processing device 100 are implemented by the processor 110 executing programs stored in the memory 120. The configuration shown in FIG. 1 is an example where the time series data processing unit 1220, which includes a group of programs and tables for time series data processing in the time series data processing device 100, includes a data reception unit 1221, a data search unit 1222 and a data monitoring unit 1223.

The data reception unit 1221 is a function module that receives time series data sent from the sensors and the like provided to the controlling and monitoring target system 300 over the communication network 500. The data reception unit 1221 transmits the received time series data to the later-described data monitoring unit 1223. The data monitoring unit 1223 monitors the operating conditions of the controlling and monitoring target system 300 which is the transmission source of the time series data, by comparing the received time series data to a monitoring query set in advance.

Figure 2B:
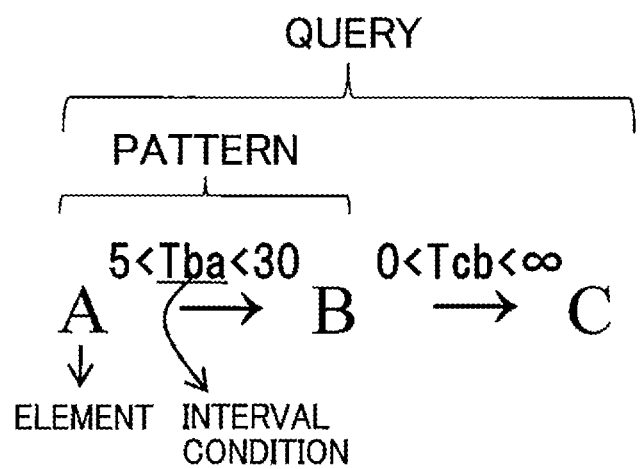
FIG. 2B is a diagram illustrating an example of a monitoring query.

Here, a description is given of the time series data and the monitoring query. FIG. 2A shows an example of the configuration of the time series data and FIG. 2B shows an example of the configuration of the monitoring query. As shown in FIG. 2A, the time series data 2000 is a collection of data sets including attributes, times and dates, and values. The data sets include output values from the sensors provided to the controlling and monitoring target system 300 and information relating to operations or processes performed in the controlling and monitoring target system 300. The attribute column has recorded therein such items as the types of sensors comprising the data transmission source and details of the operations executed. The time and date column has recorded therein timestamps that indicate the time and date when the corresponding attributes and values were transmitted. The value column has recorded therein matters such as values of the measurements relating to the corresponding attributes or operations, processes and the like. For example, the entries in the first line in FIG. 2A indicate that a measurement value of "15.2" was transmitted on Jul. 1, 2011 at 7:00 o'clock from the pressure sensor in the controlling and monitoring target system 300. And the entries in the third line in FIG. 2A record that an operation of "MANUAL START" was executed on Jul. 1, 2011 at 7:00 o'clock for the controlling and monitoring target system 300.

FIG. 2B shows a configuration example of the query used in common to the monitoring query and a later-described search query. The query is a search condition applied by the data monitoring unit 1223 or the later-described data search unit 1222 to check whether an event of a specific pattern has occurred in the time series data 2000 example shown in FIG. 2A. The pattern includes, for elements that are information indicating events such as operations and processes in the controlling and monitoring target system 300 or sensor outputs and the like, two elements adjacent in terms of time and the interval condition therebetween. The element interval is a value representing the difference in the time information between the elements and the interval condition is an inequality used to determine whether the search condition set to the element interval defined by "specified minimum value<element interval<specified maximum value" holds. For example, in FIG. 2B, the condition for this query holds when event B occurs 5 to 30 minutes inclusive after event A occurs, and event C occurs 0 to ∞ minutes inclusive thereafter. Note that, in FIG. 2B, the element intervals are described as $Tba=Tb-Ta$, $Tcb=Tc-Tb$ given that the time at which events A, B and C occur are Ta, Tb and Tc, respectively.

Returning to FIG. 1, the data search unit 1222 is described next. The data search unit 1222 searches the time series data according to the search query received from the client computer 400 and determines whether there is a time series data set that matches the search query. The data search unit 1222 is provided with a search query reception unit 1224, a query change unit 1225 and a query execution unit 1226. The query change unit 1225 further has an element sequence rearrangement unit 12251 and an interval condition setting unit 12252, and the query execution unit 1226 has a time lag search result detection unit 12261.

Figure 3:
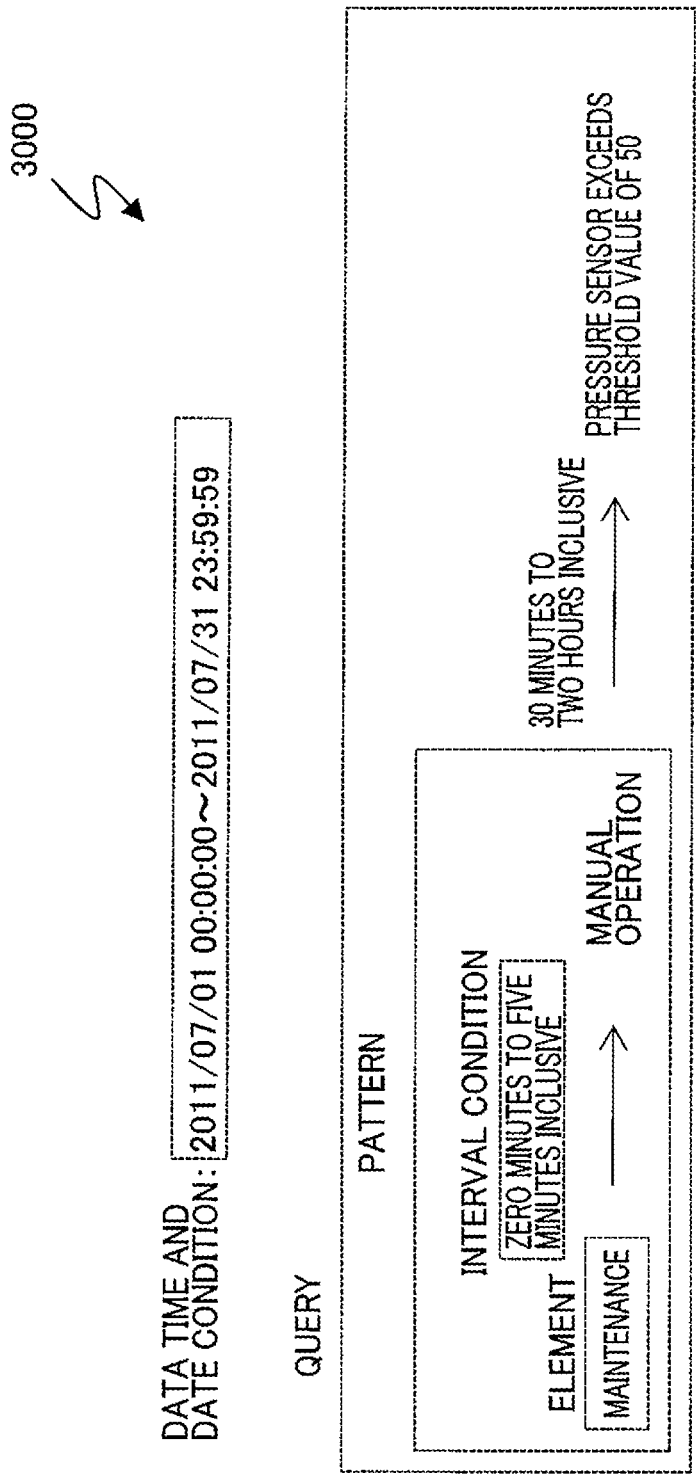
FIG. 3 is a diagram illustrating a configuration example of a monitoring query of embodiment 1.

The search query reception unit 1224 receives the search query created by the client computer 400. FIG. 3 shows a configuration example of the search query 3000. Similar to the monitoring query described with reference to FIG. 2A, the search query 3000 is configured of a combination of one or more patterns and is a search condition used for determining whether predetermined events have occurred at a predetermined time interval in the time series data. In the search query 3000 example shown in FIG. 3, a data time and date condition that is the time and date condition for the time series data as the target for search and a query as the search target are combined. In the search query 3000 example shown in FIG. 3, it is determined whether or not time series data satisfying the search condition of "after starting maintenance at the controlling and monitoring target system 300, manual operation is started within zero to five minutes inclusive, and the pressure sensor output value exceeds the threshold value of 50, 30 minutes to two hours inclusive after the manual operation is started" exists between Jul. 1, 2011 00:00:00 and Jul. 31, 2011 23:59:59.

The query change unit 1225 has a function of changing the search query as needed taking into consideration the time lag relating to time information attached to the event information such as the sensor output value, operation records, and the like received from the controlling and monitoring target system 300. The element sequence rearrangement unit 12251 determines whether there is a need to rearrange the sequence of the elements due to a time lag in the time information attached to the elements included in the search query 3000, and performs a process of rearranging the sequence of the elements in the search query 3000 according to the result. The interval condition setting unit 12252 has a function of setting the interval condition set between elements, taking into consideration the time lag existing in the time information attached to the elements included in the search query 3000.

The query execution unit 1226 has a function of searching time series data using the search query changed by the query change unit 1225 taking into consideration the time lag. The time lag search result detection unit 12261 has a function of actually executing the search query 300 and checking whether there is data that matches the search query 3000 in the time series data received from the controlling and monitoring target system 300, and extracts such matching data.

Next, a description of the data monitoring unit 1223 is given. The data monitoring unit 1223 monitors the time series data from the controlling and monitoring target system 300 using the monitoring query set from the aforementioned search query 3000. The data monitoring unit 1223 is provided with a monitoring query setting unit 12231 and creates the query example shown in FIG. 2B according to the monitoring query setting instruction received from, for example, the client computer 400 to store in a later-described monitoring query setting table 1230.

Figure 4:
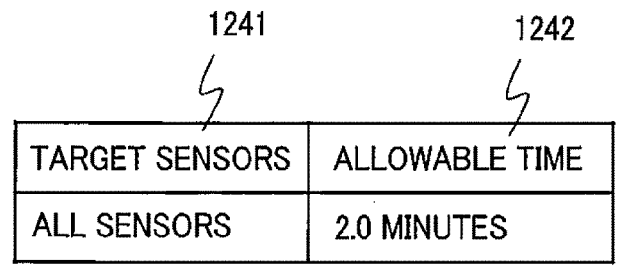
FIG. 4 is a diagram illustrating a configuration example of an allowable time lag time table 1240 of embodiment 1.

Next, a description of an allowable time lag time table 1240 is given. FIG. 4 shows a configuration example of the allowable time lag time table 1240. As mentioned above, the allowable time lag time table 1240 has recorded therein allowable time lags for the sensors provided to the controlling and monitoring target system 300. In the example shown in FIG. 4, the allowable time lag time table 1240 has recorded therein the target sensors 1241 and allowable time 1242. The target sensors 1241 is an item for specifying the sensors of the controlling and monitoring target system 300 that have set thereto the allowable time lag, and the allowable time 1242 has recorded thereto a value of the time lag allowed to the sensors specified by the target sensors 1241. The example shown in FIG. 4 indicates that up to two minutes time lag is allowed to be included in the time information of the output value for all the sensors provided to the controlling and monitoring target system 300. The details of the allowable time lag time table 1240 can be set by the systems administrator or the like and stored in the memory 120 prior to operating the time series data processing device 100.

Figure 5:
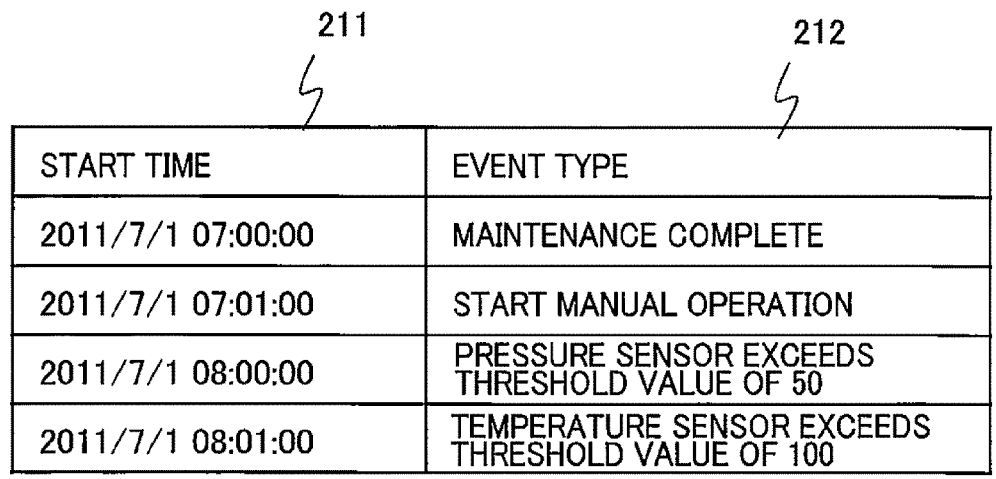
FIG. 5 is a diagram illustrating a configuration example of an aggregated data table 210 of embodiment 1.

Next, a description of an aggregated data table 210 is given. FIG. 5 shows a configuration example of the aggregated data table 210. The aggregated data table 210 has recorded therein time series data received from the controlling and monitoring target system 300, aggregated in a number of event types and used to improve search processing speed when executing the time series data monitoring process. The aggregated data table 210 shown in FIG. 5 has recorded therein the start time 211 and the event type 212. When time series data classified as the corresponding event type 212 is received from the controlling and monitoring target system 300, the start time 211 has recorded therein the time information attached to the time series data as the start time of the event. The event type 212 is an item made by comparing with each other the elements included in the multiple search queries input from the client computer 400 or the input/output device 150, and aggregated so that a plurality of the same elements are not redundantly recorded. For example, the event type 212 is set by the data search unit 1225 eliminating redundancies and recording the elements included in the search query for each received search query.

Figure 6:
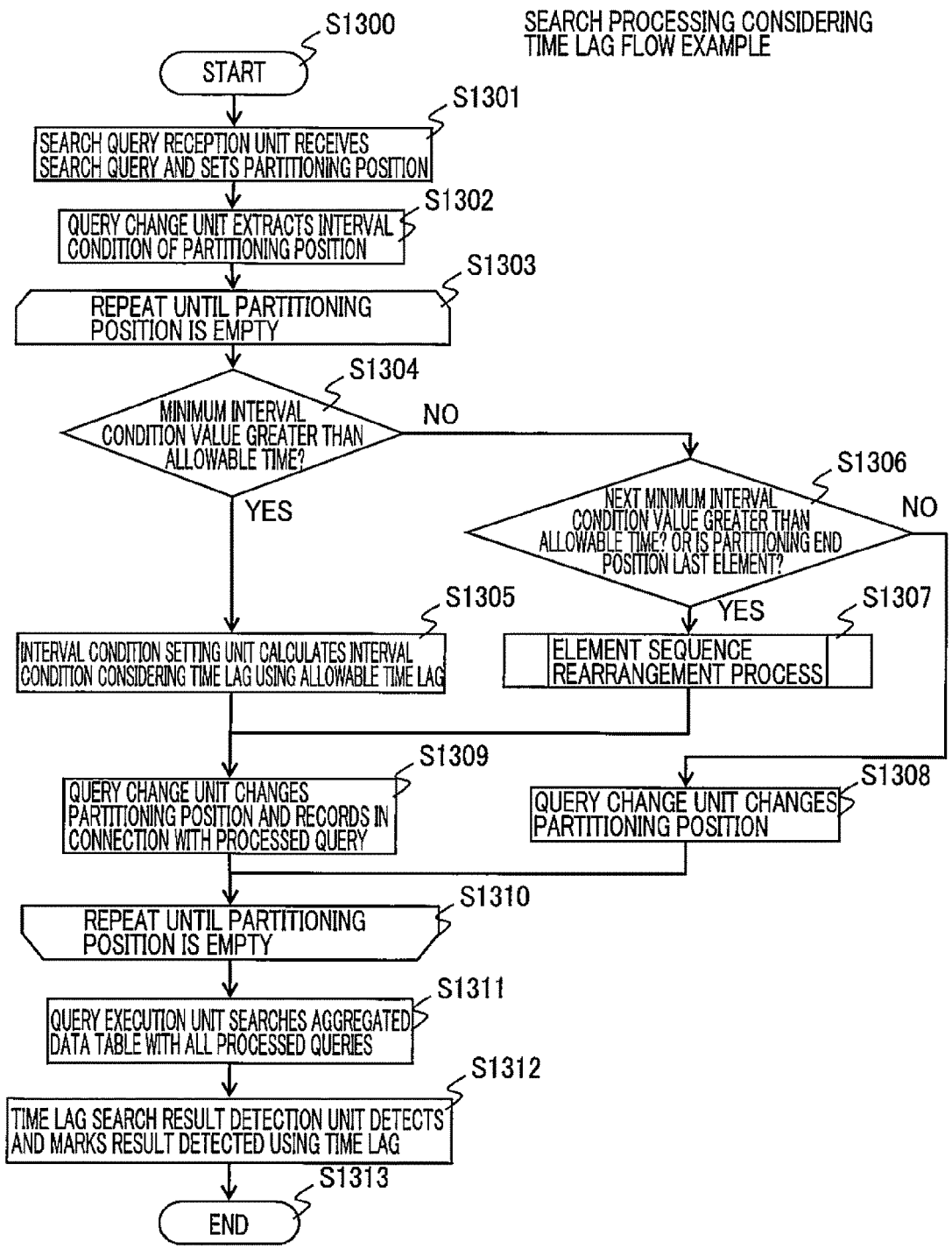
FIG. 6 is a flowchart showing an example of the search process taking time lag into consideration in embodiment 1.

Next, a description of the search process taking time lag into consideration executed in the present embodiment is given. FIG. 6 shows an example of the search process taking time lag into consideration of the present embodiment. The process of FIG. 6 is performed for search queries input from the client computer 400 or the input/output device 150, for taking time lag into consideration that may be included in the time series data sent from the controlling and monitoring target system 300.

First, when the present process is started upon reception of the search query from the client computer 400 or the input/output device 150, the search query reception unit 1224 that has received the search query sets the partitioning positions included in the search query (S1300, S1301). The partitioning positions include a partitioning start position and a partitioning end position, and the first partitioning start position is set to the first element of the search query 3000 and the first partitioning end position is set to the second element of the search query 3000, respectively. Thereafter, the query change unit 1225 extracts the interval condition corresponding to the set partitioning position (S1302). Then the query change unit 1225 repeatedly executes steps S1301 to S1310 until the partitioning end position included in the target search query is empty.

First, the query change unit 1225 determines whether the minimum specified value of the interval condition set to the first partitioning position is greater than the allowable time 1242 set to the allowable time lag time table 1240 (S1304). When the minimum specified value of the interval condition is determined to be greater than the allowable time 1242 set to the allowable time lag time table 1240 (S1304, YES), the interval condition setting unit 12252 of the query change unit 1225 applies the allowable time 1242 to the initial interval condition and calculates a new interval condition (S1305). For example, when the target interval condition is set to over five minutes and less than 10 minutes and the allowable time 1242 read from the allowable time lag time table 1240 is two minutes, the interval condition taking time lag into consideration is calculated to be over 3 (=5−2) minutes and less than 12 (=10+2) minutes. Then the query change unit 1225 changes the partitioning positions of the target search query, that is, specifies the next partitioning position included in the search query, and registers the new interval condition in the later-described monitoring query table 1230 in connection with the processed query (S1309).

On the other hand, when the minimum specified value of the interval condition is determined to be equal to or smaller than the allowable time 1242 set to the allowable time lag time table 1240 (S1304, NO), the interval condition setting unit 12252 further determines whether one of the conditions "SPECIFIED MINIMUM VALUE OF NEXT INTERVAL CONDITION GREATER THAN ALLOWABLE TIME" or "PARTITIONING END POSITION IS LAST ELEMENT OF TARGET SEARCH QUERY" holds (S1306). When one of the conditions is determined to hold (S1306, YES), the element sequence rearrangement unit 12251 performs a process of rearranging the sequence of the elements in the target search query (S1307). This element sequence rearrangement process will be described later with reference to another process example. Thereafter, the process proceeds to process S1309 performed by the query change unit 12251. Note that, when the partitioning end position is determined to be the last element in S1306, the process exits the loop of S1303 to S1310 after executing the process of S1309.

On the other hand, when none of the conditions in S1306 is determined to hold (S1306, NO), the interval condition setting unit 12252 changes the partitioning position of the target search query to the next partitioning position (S1308) and returns the process to S1304.

After exiting the loop of S1303 to S1310, with the process of reflecting the allowable time lag for the target search queries being completed, the query executing unit 1226 refers to the aggregated data table 210 and searches whether there is an event type 212 that applies to all processed search queries (S1311). Then, the time lag search result detection unit 12261 of the query execution unit 1226 marks the effect by such as adding information that has set time lag reflected in the result extracted by the search query taking time lag into consideration, and ends the present process (S1312, S1313).

According to the above-described embodiment of the search process taking time lag into consideration, when time lag is included in the time series data received from the controlling and monitoring target system 300, a search query taking the time lag into consideration can be created.

Figure 7:
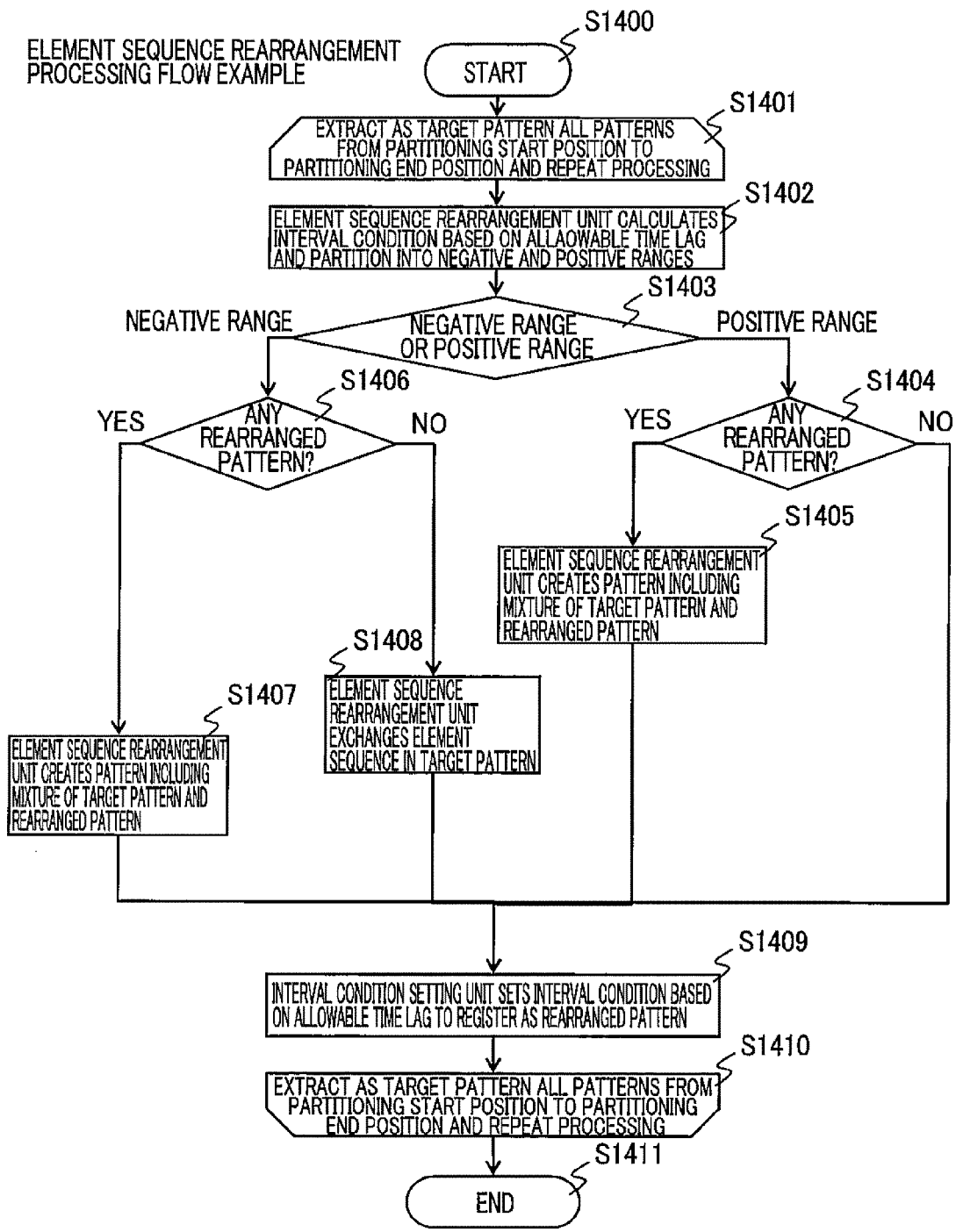
FIG. 7 is a flowchart showing an example of an element sequence rearrangement process shown as S1307 of FIG. 6.

Next, the element sequence rearrangement process performed in the present embodiment will be described. FIG. 7 shows an example of this element sequence rearrangement process. The element sequence rearrangement process is step of S1307 in the search process of FIG. 7 and is executed by the element sequence rearrangement unit 12251 when either the "SPECIFIED MINIMUM VALUE OF NEXT INTERVAL CONDITION GREATER THAN ALLOWABLE TIME" or "PARTITIONING END POSITION LAST ELEMENT OF TARGET SEARCH QUERY" holds in S1306 of FIG. 6.

To begin with, when the present process starts at S1400 in response to the results of the determination made in S1306, the element sequence rearrangement unit 12251 extracts as the target pattern all patterns included in the target search query from the partitioning start position to the partitioning end position and executes processing sequentially (the loop of S1401 to S1410). First, the element sequence rearrangement unit 12251 calculates the interval condition based on the allowable time lag and partitions the interval condition into a negative range and a positive range (S1402). The negative range represents a case in which the minimum specified value of a result of applying the allowable time lag to the minimum specified value of the interval condition is a negative value. For example, when the minimum specified value is one minute and two minutes was applied as the allowable time lag, the minimum specified value becomes 1−2=−1 (minute). Such circumstances are called the negative range.

Subsequently, the element sequence rearrangement unit 12251 determines whether the interval condition taking time lag into consideration is in the negative range or the positive range (S1403). When determined to be in the negative range (S1403, NEGATIVE RANGE), the element sequence rearrangement unit 12251 determines whether a rearranged element sequence pattern exists for the next target search query (S1406). When determining that a rearranged element sequence pattern exists (S1406, YES), the element sequence rearrangement unit 12251 creates a pattern including a mixture of a target pattern and a rearranged pattern (S1407). Subsequently, the interval condition setting unit 12252 sets the interval condition based on the allowable time lag for registration as the rearranged pattern (S1409).

Upon determining that a rearranged element sequence pattern does not exist (S1406, NO) at S1406, the element sequence rearrangement unit 12251 rearranges the element sequence in the target pattern (S1408). Subsequently, the interval condition setting unit 12252 sets the interval condition based on the allowable time lag for registration as the rearranged pattern (S1409).

When the element sequence rearrangement unit 12251 determines that the interval condition taking time lag into consideration at S1402 is in the positive range (S1403, POSITIVE RANGE) at S1403, the element sequence rearrangement unit 12251 determines whether there is a rearranged element sequence pattern for the next target pattern (S1404). When it is determined that a rearranged element sequence pattern exists (S1404, YES), the element sequence rearrangement unit 12251 creates a pattern including a mixture of a target pattern and the exchanged rearranged pattern (S1405). Subsequently, the interval condition setting unit 12252 sets the interval condition based on the allowable time lag for registration as the rearranged pattern (S1409).

When it is determined that a rearranged element sequence pattern does not exist (S1404, NO) at S1404, the interval condition setting unit 12252 sets the interval condition based on the allowable time lag as is for registration as the rearranged pattern (S1409). The above process is, as described above, performed for all patterns of the search query from the partitioning start position to the partitioning end position.

Time lag can be appropriately reflected in the interval condition included in the search query according to the element sequence rearrangement process described above.

Figure 8:
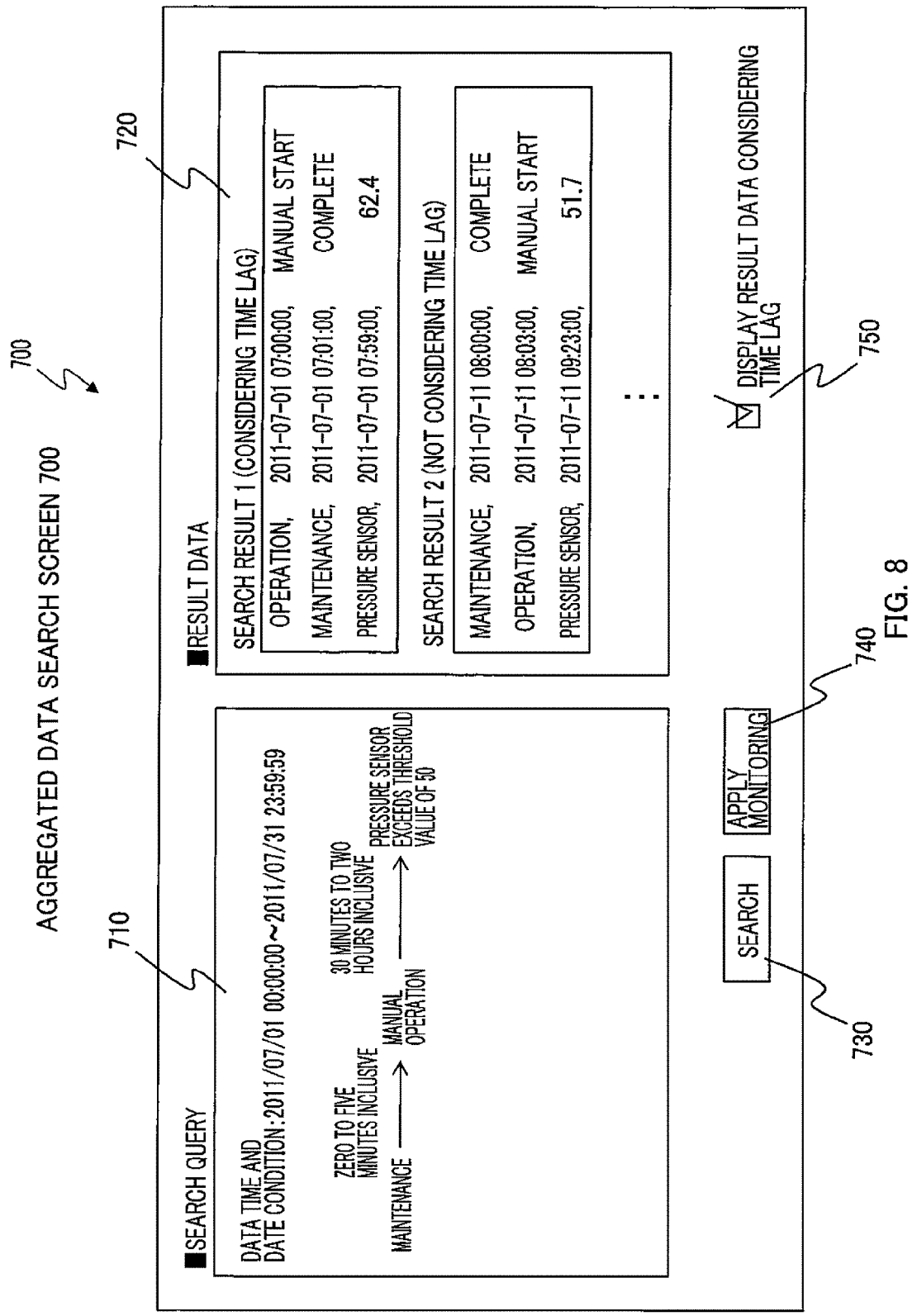
FIG. 8 is a diagram illustrating a configuration example of an aggregated data search screen 700 in embodiment 1.

FIG. 8 shows a configuration example of an aggregated data search screen 700 using the search query taking time lag into consideration created above. The aggregated data search screen 700 can output to the client computer 400 or the output device 150 of the time series data processing device 100. The aggregated data search screen 700 is provided with display of the search query 710 and the result data 720, and operation objects of search button 730, apply monitoring button 740 and consider time lag check box 750. The search query to be the target of the process taking time lag into consideration is displayed in the search query 710. The result of searching the aggregated data using the search query displayed in the search query 710 is displayed in the result data 720 classified into taking time lag into consideration and not taking time lag into consideration. The search button 730 is operated when performing aggregated data search with the search query displayed in the search query 710. The apply monitoring button 740 is operated when the search query displayed in the search query 710 is used as the monitoring query, and the search query is registered in the monitoring query table 1230 with this operation. The consider time lag check box 750 is ticked when displaying a search result taking into consideration the time lag with regard to the search query displayed in the search query 710. When the consider time lag check box 750 is not ticked, only data that does not take time lag into consideration is displayed in the result data 720.

FIG. 9 shows a configuration example of the monitoring query table 1230 in which the monitoring query created by taking the above allowable time lag into consideration is registered. The monitoring query table 1230 is a table to be referred to when the data monitoring unit 1223 performs the later-described monitoring process of the time series data, and has stored therein the monitoring query created by applying allowable time lag to the search query set from the client computer 400 or the input/output device 150. In the example of FIG. 9, two monitoring queries "MAINTENANCE→(ZERO TO SEVEN MINUTES INCLUSIVE) →MANUAL OPERATION→(28 MINUTES TO TWO HOURS TWO MINUTES INCLUSIVE)→PRESSURE SENSOR EXCEEDS THRESHOLD VALUE OF 50" and "MANUAL OPERATION→(ZERO TO TWO MINUTES INCLUSIVE)→MAINTENANCE→(28 MINUTES TO TWO HOURS TWO MINUTES INCLUSIVE)→PRESSURE SENSOR EXCEEDS THRESHOLD VALUE OF 50" are created as the monitoring query 1231 and stored by applying allowable time lag of two minutes to "MAINTENANCE→(ZERO TO FIVE MINUTES INCLUSIVE) →MANUAL OPERATION→(30 MINUTES TO TWO HOURS INCLUSIVE)→PRESSURE SENSOR EXCEEDS THRESHOLD VALUE OF 50" which is the original search query. The query type 1232 is identifiable by attaching the same code to a plurality of monitoring queries created from the same search query.

Figure 10:
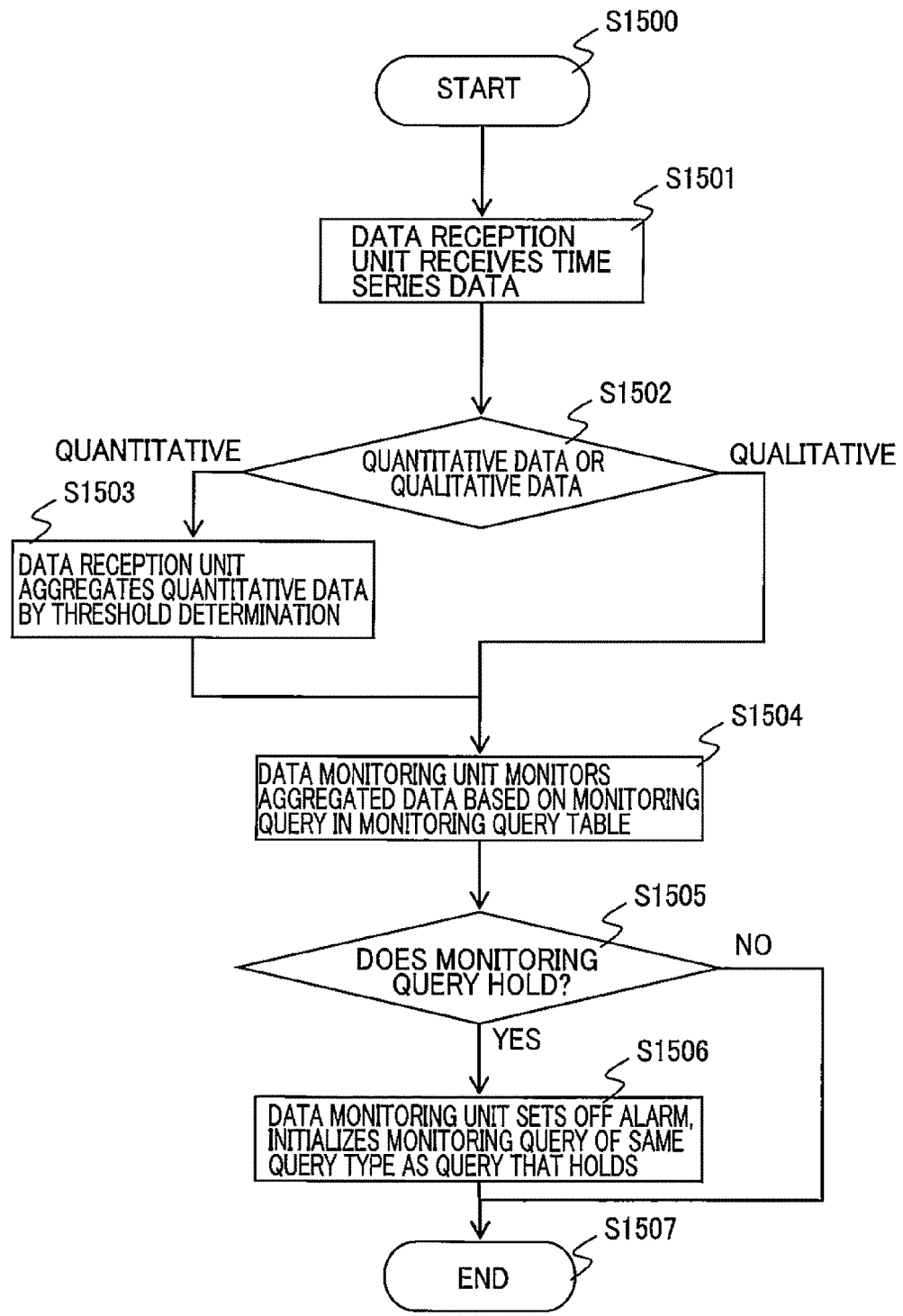
FIG. 10 is a flowchart showing an example of the time series data monitoring process of embodiment 1.

In the following, a description of the time series data monitoring processing performed in the present embodiment is given. FIG. 10 shows an example of the time series data monitoring process. When the process in FIG. 10 is started (S1500) upon operation of the data processing system 1 of the present embodiment, the data reception unit 1221 firstly receives the time series data form the controlling and monitoring target system 300 (S1501). The data reception unit 1221 determines whether the received time series data is quantitative data or qualitative data (S1502) and when determined to be quantitative data (S1502, QUANTITATIVE), the data reception unit 1221 aggregates the quantitative data using a threshold value defined in the aggregated table 210 (S1503). When determined to be qualitative data (S1502, QUALITATIVE) at S1502, the data reception unit 1221 proceeds to S1504 as is.

At S1504, the data monitoring unit 1223 monitors the aggregated data based on the monitoring query 1231 stored in the monitoring query table 1230 (S1504), and when the monitoring query 1231 is determined to hold (S1505, YES), sends an alarm to the client computer 400 or the input/output device 150, performs an initialization process for the monitoring query 1231 that has the same query type 1232 as the monitoring query 1231 that holds, and ends the process (S1506, S1507). When the monitoring query 1231 is determined not to hold at S1505 (S1505, NO), the data monitoring unit 1223 ends the process (S1507) as is.

According to the above-described time series data monitoring process, abnormal events and the like that have occurred in the time series data can be appropriately detected taking allowable time lag into consideration.

Embodiment 2

Figure 11:
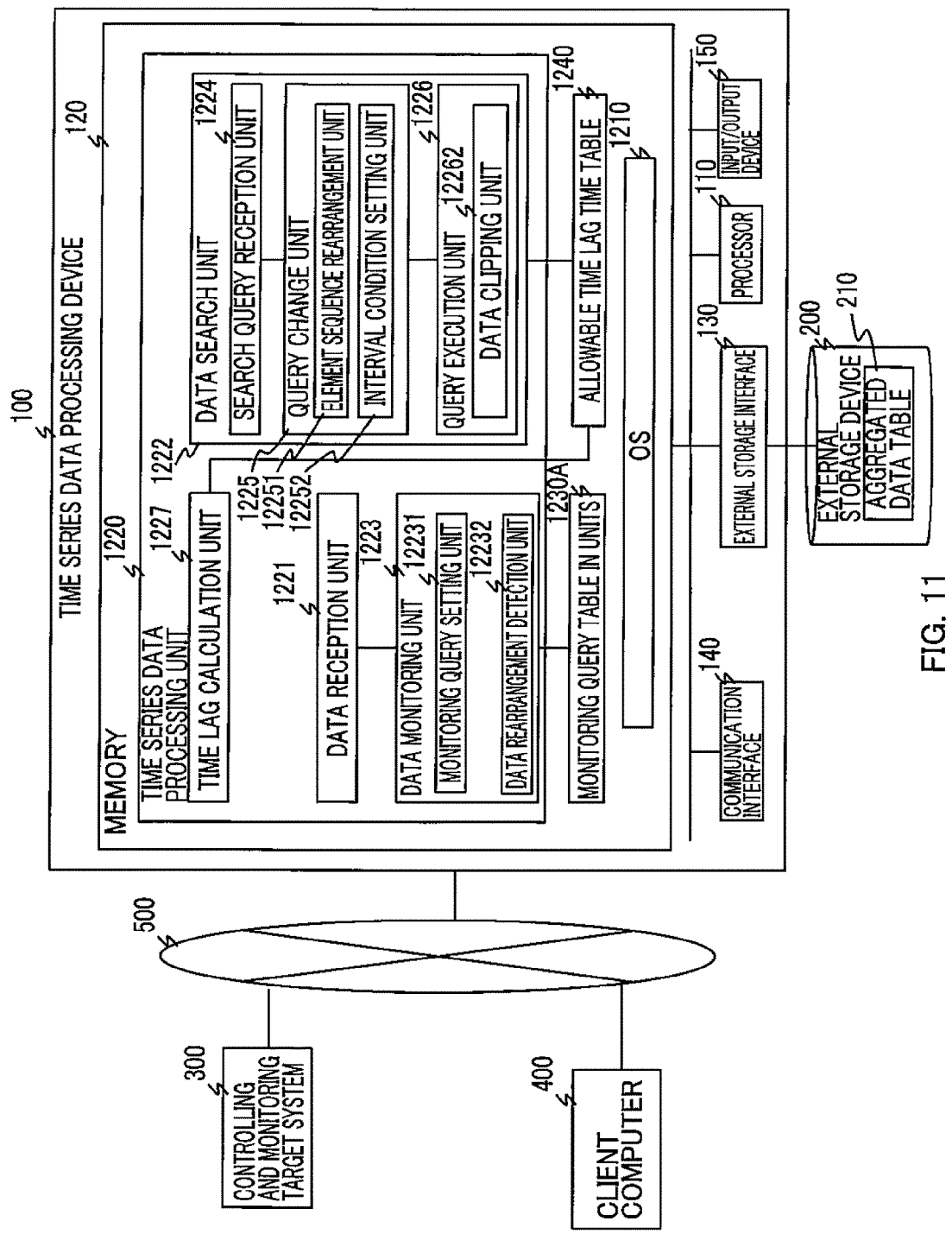
FIG. 11 is a diagram illustrating a configuration of the time series data processing device 100 of embodiment 2 of the present invention.

Next, a description of embodiment 2 of the present invention is given. FIG. 11 shows a configuration example of the time series data processing device 100 of embodiment 2. The basic configuration of the time series data processing device 100 of the embodiment 2 is similar to that of embodiment 1 example shown in FIG. 1 except that the time series data processing device 100 of embodiment 2 includes a time lag calculation unit 1227, a data clipping unit 12262 and a data rearrangement detection unit 12232. The time lag calculation unit 1227, the data clipping unit 12262, and the data rearrangement detection unit 12232 are programs that have corresponding respective functions similar to embodiment 1. Further, another point of difference is that the monitoring query table 1230 in embodiment 1 has been changed to monitoring query table in units 1230A.

The time lag calculation unit 1227 has a function of reflecting, in the allowable time lag, information relating to time lag included in the time series data received from the various sensors provided to the controlling and monitoring target system 300, by automatically collecting the information from the sensors. The data clipping unit 12262 has a function of dividing the time series data of the search target into a certain range for performing a search when searching time series data taking time lag into consideration. The data rearrangement detection unit 12232 has a function of rearranging time series data that is the target of the above search range. These functions are described later with reference to the process example.

Figure 12:
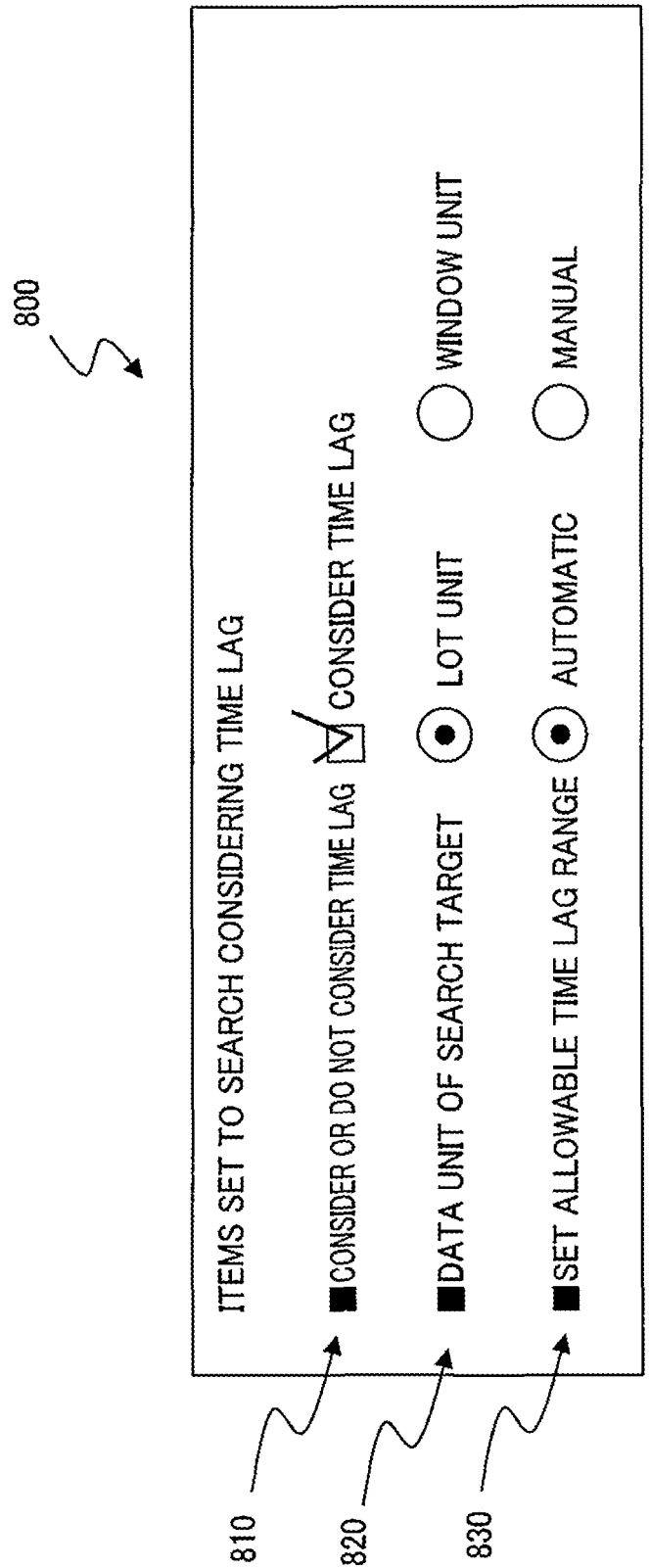
FIG. 12 is a diagram illustrating a configuration example of the setting screen for search taking time lag into consideration in embodiment 2.

FIG. 12 shows a configuration example of the search considering time lag configuration screen 800 in embodiment 2. This configuration screen 800 can output to the client computer 400 or the input/output device 150 before operating the time series data processing device 100 of the present embodiment or when changing the setting conditions after starting operation. The configuration screen 800 example shown in FIG. 12 includes items of consider or do not consider time lag 810, data unit of search target 820, and set allowable time lag range 830. The consider or do not consider time lag 810 includes a checkbox that enables selection of whether or not time lag is to be considered for the time series data search. The item in data unit of search target 820 includes a radio button for selecting what units are to be used for monitoring the time series data. And in the example of the present embodiment, the data unit of search target 820 is between monitoring in units of lots, that is the amount of units manufacturing, inspection, and the like performed in the controlling and monitoring target system 300 of the time series data, and in units of time windows, relating to time information of the time series data. The set allowable time lag range 830 includes a radio button for selecting the details of the allowable time lag time table 1240, between manual setting as in embodiment 1 and automatic setting described later with regard to the present embodiment.

Figure 13:
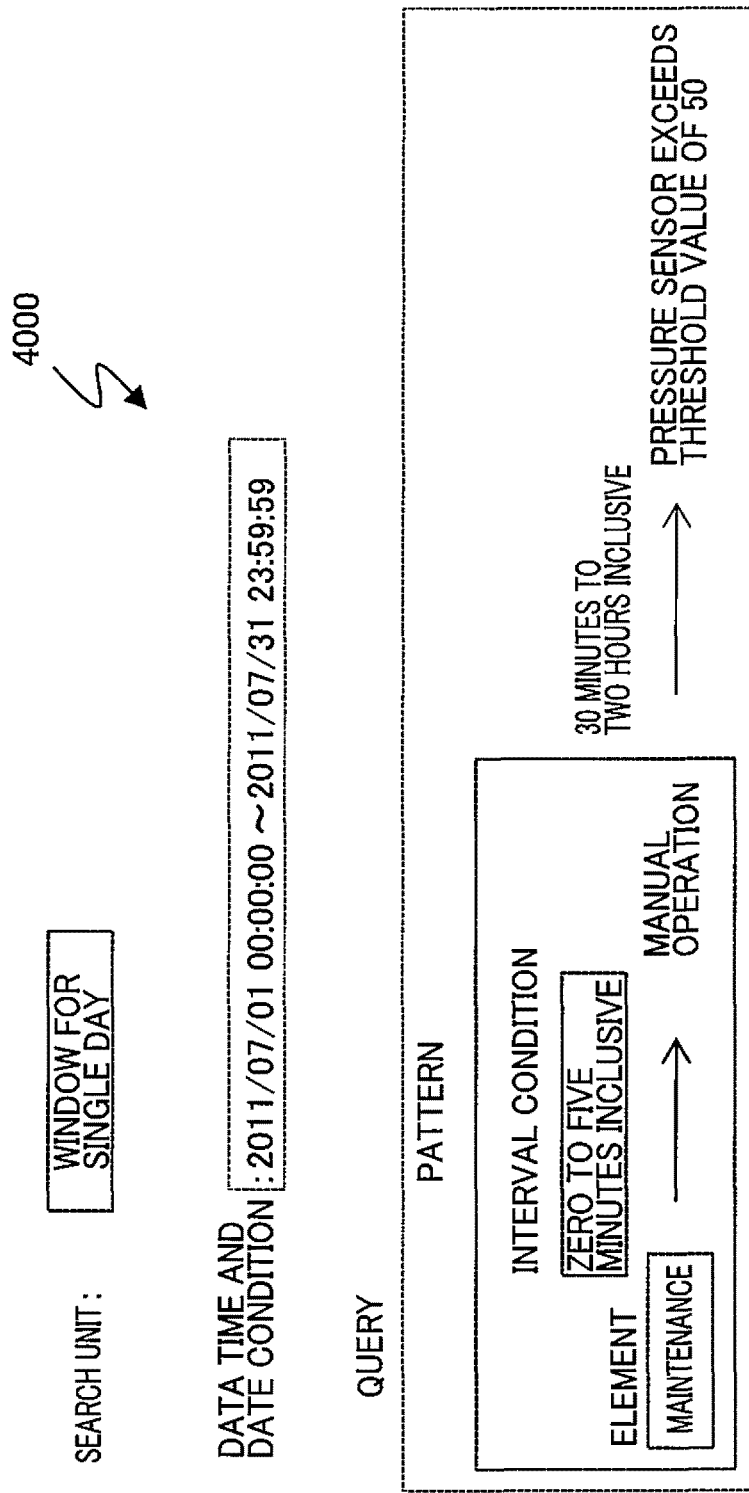
FIG. 13 is a diagram illustrating a configuration example of a monitoring query of embodiment 2.

FIG. 13 schematically shows a configuration example of the search query 4000 in embodiment 2. The configuration of the search query 4000 is basically the same as that of the search query 3000 in embodiment 1 shown in FIG. 3 except that the search query 4000 has an item of search units added. In the example of FIG. 13, searching in units of windows for a single day is recorded in the item of search units.

FIG. 14 shows a configuration example of the allowable time lag time table 1240 in embodiment 2. The configuration of the allowable time lag time table 1240 of FIG. 2 is similar to that of the allowable time lag time table 1240 of embodiment 1 example shown in FIG. 4 except that the item of allowable time lag 1242 has stored therein in time series a value indicating the lag between time information on time series data received from the sensors included in the controlling and monitoring target system 300 and the system clock of the time series data processing device 100, at a predetermined time. Sensor 1 of sensor name 1241 in the example of FIG. 14 has recorded therein the delay on Jul. 1, 2011 at 0 o'clock to be 1.0 minute and the delay on Aug. 1, 2011 at 0 o'clock to be 1.1 minutes, respectively. When the time information of time series data received from the sensors is faster than the system clock, a negative value is recorded in the allowable time lag 1242.

Figure 15:
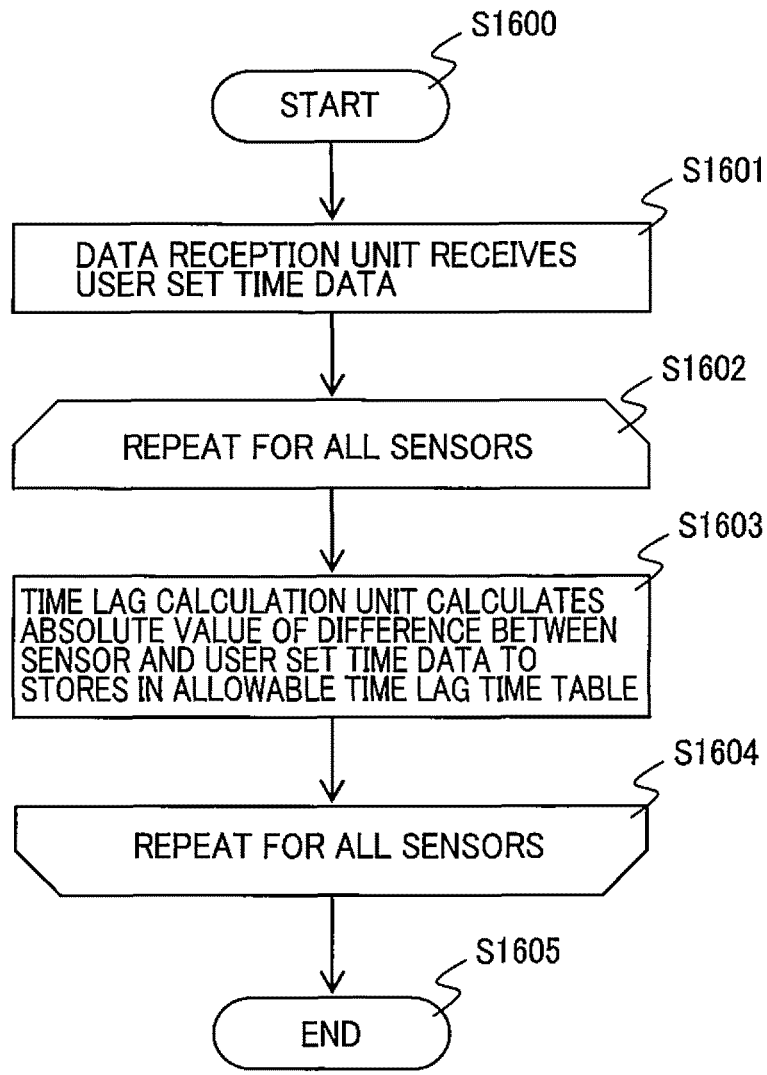
FIG. 15 is a flowchart showing an example of the time lag value acquiring and recording process in embodiment 2.

Next, a description of data processing performed in embodiment 2 is given. FIG. 15 shows an example of a time lag value acquiring and recording process in embodiment 2. The time lag value acquiring and recording process is mainly performed for implementing automatic settings of the allowable time lag by the time lag calculating unit 1227. The time lag value acquiring and recording process is started when the consider or do not consider time lag 810 is ticked in the configuration screen 800 and the set allowable time lag range 830 is set to automatic, and then the data reception unit 1221 receives user-set time data first (S1600, S1601).

Subsequently, the time lag calculating unit 1227 calculates the absolute value of the difference between the time information of time series data from the sensors and the user-set time information and repeats the process of storing the absolute value in the allowable time lag time table 1240 for all the sensors that send time series data from the controlling and monitoring target system 300, and then ends processing (S1602 to S1605).

Figure 16:
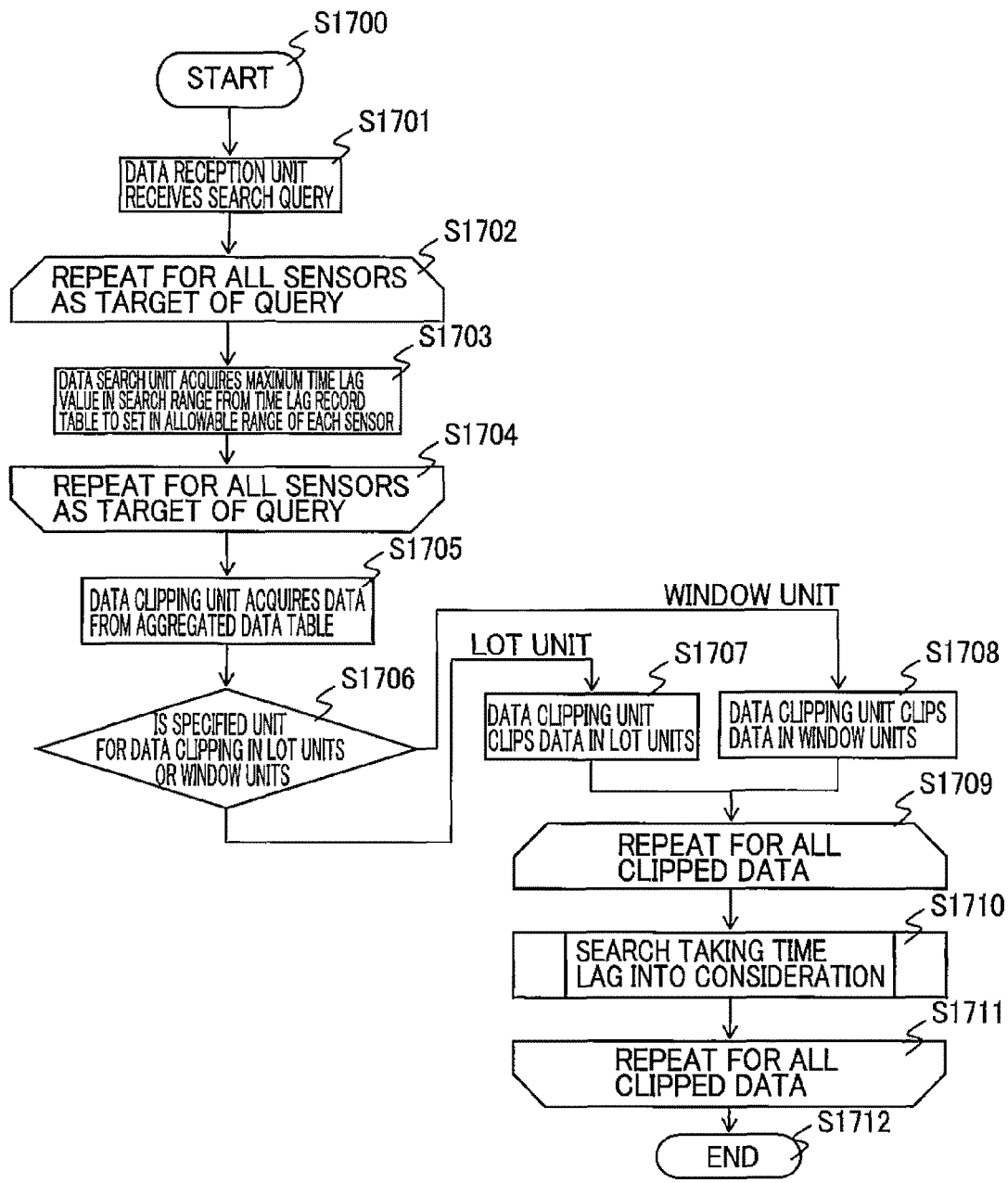
FIG. 16 is a flowchart showing an example of search process by automatic adjustment and data clipping of allowable time lag in embodiment 2.

Next, a description of the search process by automatic adjustment of allowable time and data clipping performed in embodiment 2 is given. A search process taking time lag into consideration described in embodiment 1 is performed after executing automatic adjustment of allowable time based on acquired time lag from the sensors and data clipping in accordance with the data units set by the data unit of search target 820 in the configuration screen 800, in the search process by automatic adjustment of allowable time and data clipping. FIG. 16 shows an example of the search process by automatic adjustment of allowable time and data clipping of embodiment 2.

First, when the present processing is started by an instruction from the client computer 400 or the input/output device 150 (S1700), the data reception unit 1221 receives the search query 400 from the client computer 400 or the input/output device 150 (S1701). Subsequently, the data search unit 1222 refers to the allowable time lag time table 1240 and acquires the maximum time lag value in the search range to set as the allowable time for the target sensor (S1703). The process of S1703 is repeated for all the sensors registered in the sensor name 1241 of the allowable time lag time table 1240 (S1702 to S1704).

Then the data clipping unit 12262 acquires data in the search range from the aggregated data table 210 (S1705) and determines whether the data clipping unit specified in the search query 4000 is in lot units or window units (S1706). When determining that the data clipping unit specified in the search query 4000 is in lot units (S1706, LOT UNIT), the data clipping unit 12262 performs data clipping in lot units on data acquired from the aggregated data table 210 (S1707). When determining that the data clipping unit specified in the search query 4000 is in window units (S1706, WINDOW UNIT), the data clipping unit 12262 performs data clipping in window units on data acquired from the aggregated data table 210 (S1708). Automatic adjustment of allowable time and data clipping taking search data units into consideration are completed with the steps up to S1708. Thereafter, a search process taking time lag into consideration as shown in FIGS. 7 and 8 is performed for all the aggregated data clipped in S1707 or S1708, and then the process is terminated (S1709 to S1711, S1712).

Figure 18:
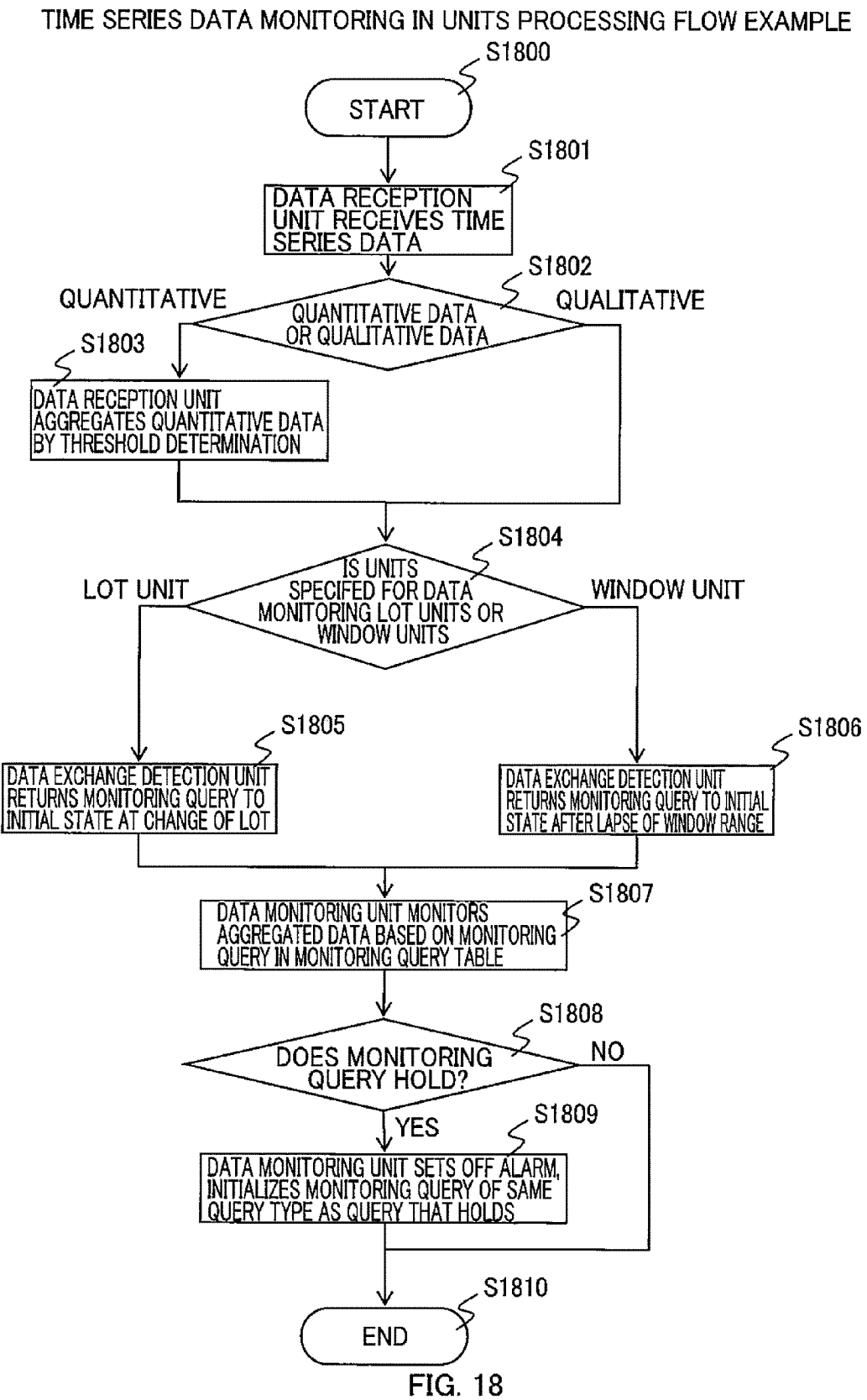
FIG. 18 is a flowchart showing an example of time series data monitoring in units in embodiment 2.

Next, a description of unit monitoring processing of time series data performed in embodiment 2 is given. This unit monitoring processing of time series data is a process of performing the process of monitoring time series data in embodiment 1 according to predetermined data units set to the search query 4000. FIG. 18 shows an example of the unit monitoring processing of time series data. The process shown in FIG. 18 adds a processing step of performing monitoring processing in predetermined data units to the monitoring process of embodiment 1 example shown in FIG. 10. In other words, steps S1800 to S1803 and S1807 to S1810 in the process of FIG. 18 are the same as S1500 to S1507 in the process of FIG. 10, with S1804 to S1806 have been added in FIG. 18. Therefore, the added steps are described with respect to FIG. 18. FIG. 10 of embodiment 1 should be referred to for the other steps.

In the unit monitoring process of time series data example shown in FIG. 18, after the time series data received at S1802 and S1803 are classified into quantitative data and qualitative data, the data monitoring unit 1223 detects whether the data units specified in search query 4000 is in lot units or window units (S1804). When the data unit specified in search query 4000 are determined to be lot units (S1804, LOT UNIT), the data rearrangement detection unit 12232 performs for the data acquired from the aggregated data table 210 a process of returning the monitoring query to the initial state when the lot changes (S1805). Thereafter, the data monitoring unit 1223 newly starts monitoring the aggregated data. Completion of a process for a certain lot unit can be achieved by, for example, the data monitoring unit 1223 identifying the lot number information or the like attached to the time series data or aggregated data. When the data units specified in search query 4000 are determined to be in window units (S1804, WINDOW UNIT), the data rearrangement detection unit 12232 performs a process of returning the monitoring query to the initial state after lapse of the window range (S1806) for data acquired from the aggregated data table 210. Thereafter, the data monitoring unit 1223 newly starts monitoring the aggregated data. Completion of a process for a certain time window unit can be achieved by, for example, the data monitoring unit 1223 identifying the time information attached to the time series data or aggregated data.

According to the time series data processing device 100 of embodiment 2 of the present invention described above, the allowable time lag value of sensors and the like that should take into consideration the processing of the time series data can be set automatically. Further, the time series data as the target of monitoring can be processed in lot units for the controlling and monitoring target system 300 and in time window units of time such as a single unit day of time series data, as convenient for management. Note that, the time series data processing taking data units into consideration can be applied in the configuration of embodiment 1 that manually sets the allowable time lag value.

Embodiment 3

A description of the time series data processing device 100 according to embodiment 3 of the present invention is given. The time series data processing device 100 of embodiment 3 has as an objective to detect events that act as prior warnings of system failure and the like that may occur in the controlling and monitoring target system 300. The embodiment 3 differs in this respect from embodiment 1 or embodiment 2 that detect the occurrence of an abnormal event in the controlling and monitoring target system 300 from the time series data.

Figure 19:
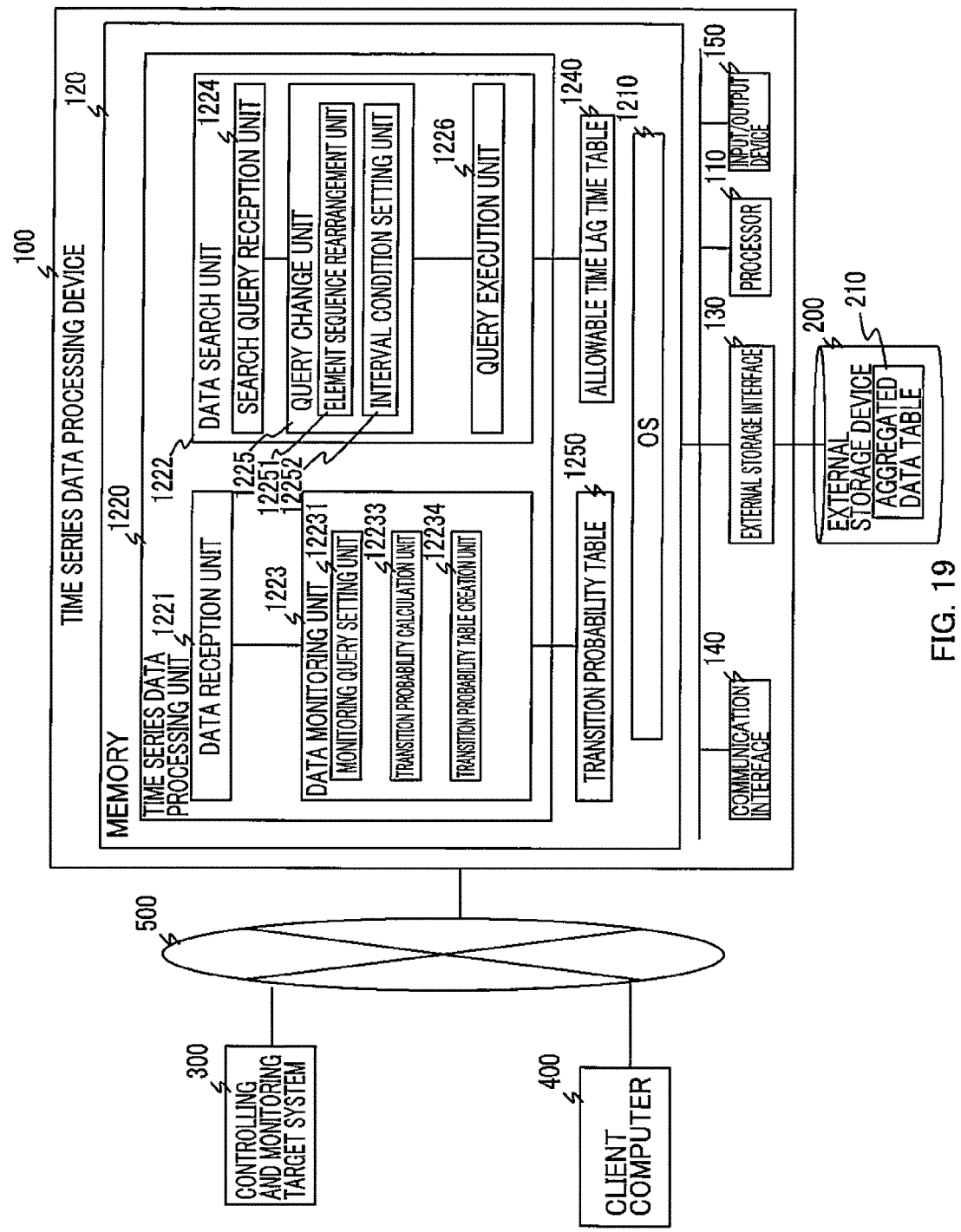
FIG. 19 is a diagram illustrating a configuration of the time series data processing device 100 in embodiment 3 of the present invention.

FIG. 19 shows a configuration example of the data processing system 1 including the time series data processing device 100 according to embodiment 3. The configuration of embodiment 3 shown in FIG. 19 is basically similar to the configuration example of embodiment 1 shown in FIG. 1 except that the configuration of embodiment 3 includes a transition probability calculation unit 12233, a transition probability table generator 12234, and a transition probability table 1250 for detecting prior warnings of an occurrence of an abnormal event in the controlling and monitoring target system 300, based on time series data received from the controlling and monitoring target system 300.

Here, a description of the transition probability used as an index for detecting a prior warning of an event occurring in the present embodiment is given. FIG. 20 shows a configuration example of the transition probability table 1250 created and used in the time series data processing device 100 of the present embodiment. The transition probability table 1250 is a table created by the aforementioned transition probability calculation unit 12223 and the transition probability table generator 12224. The transition probability table 1250 example shown in FIG. 20 has recorded therein a monitoring query 1251, a first pattern 1252, and a second pattern 1253. Further, the first pattern 1252 and the second pattern 1253, respectively, have recorded therein a first element detection frequencies 12521, 12531, second element transition frequencies 12522, 12532, and transition probabilities 12523, 12533. The monitoring query 1251 is similar to the monitoring query table 1230 of embodiment 1 shown in FIG. 9 and has recorded therein the monitoring query set taking allowable time lag into consideration.

The first pattern 1252 and the second pattern 1253 are items that have the corresponding monitoring query 1251 sequentially divided and recorded into patterns included therein. Further, as a result of checking the time series data aggregated in the aggregated data table 210, the first pattern 1252 and the second pattern 1253 have recorded therein as the first element detection frequency 12521 the frequency with which the first element was detected in the first pattern 1252 of the corresponding monitoring query 1251, and after detecting the first element, has recorded therein as the second element transition frequency 12522 the frequency of transitions to the second element after satisfying the interval condition. The number of pattern items may be incremented to correspond to the number of patterns included in the corresponding monitoring query 1251. The transition probabilities 12523, 12533 are defined as the ratio of the second element transition frequency 12522 to the first element detection frequency 12521. Referring to the top entry of FIG. 20, for example, with the first pattern 1252, the elements whose maintenance is completed had been detected 200 times and within zero to seven minutes inclusive thereafter, the elements that had operation started manually had been detected 100 times. As a result, the transition probability 12523 of the first pattern 1252 is calculated as 100/200=0.5. Since the transition probability 12533 of the second pattern 1253 alone is 0.3, the transition probability when the corresponding monitoring query 1251 holds will be 0.5*0.3=0.15.

Figure 21:
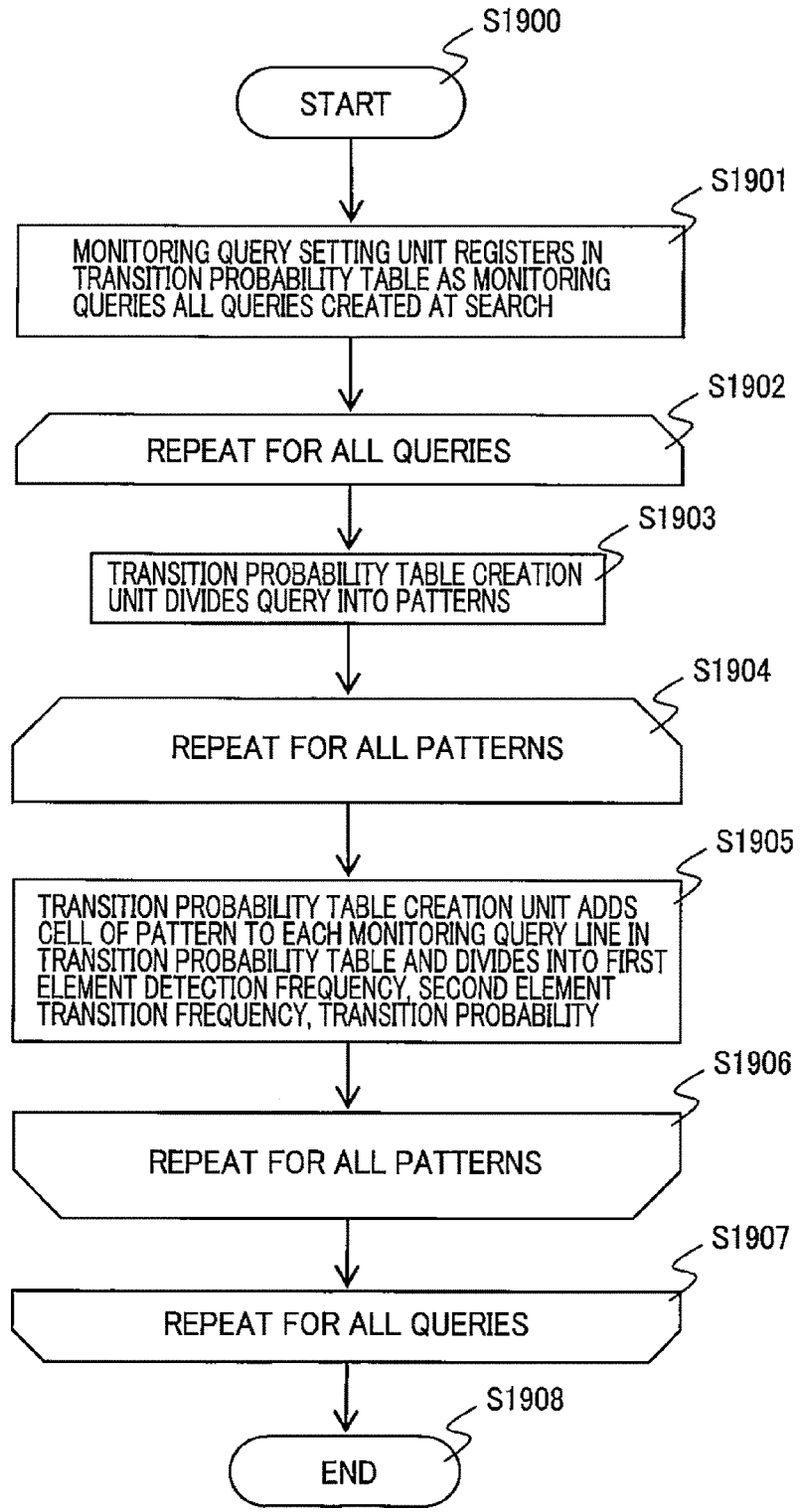
FIG. 21 is a flowchart for illustrating an example of the transition probability table generation process in embodiment 3.

Next, a description of the process of generating of the transition probability table 1250 in the present embodiment is given. FIG. 21 shows an example of the transition probability table 1250 generation process. The transition probability table 1250 generation process example shown in FIG. 21 is started upon on an input from, for example, the client computer 400 or the input/output device 150 instructing to create the transition probability table (S1900). First, the monitoring query setting unit 12231 of the data monitoring unit registers all the search queries created when performing the search process, in the monitoring query 1251 of the transition probability table 1250 (S1901). Then the transition probability table generator 12224 of the data monitoring unit 1223 divides each monitoring query 1251 recorded in the transition probability table 1250 into patterns included in each monitoring query 1251 (S1903). The transition probability table generator 12224 adds the patterns 1252, . . . to the entries corresponding to the monitoring queries 1251 in the transition probability table 1250 and provides the first element detection frequency 12521, second element transition frequency 12522, and transition probability 12523 (S1905). The process of S1905 is performed for all the patterns included in the monitoring queries 1251 (S1904 to S1906) and thereby patterns such as the first pattern 1252 and the second pattern 1253 are added as needed as shown in FIG. 20. Additionally, the process after S1903 of dividing the monitoring query 1251 into the patterns included therein are repeated for all the monitoring queries 1251 registered in the transition probability table 1250 at S1901 (S1902 to S1907), and ends the present processing thereafter (S1908). The above transition probability table 1250 generation process allows creation of the transition probability table 1250 of the present embodiment shown in FIG. 20 and thus detection of prior warnings of such as an abnormal event in the controlling and monitoring target system 300 can be achieved with the use of the transition probability table 1250.

Figure 22:
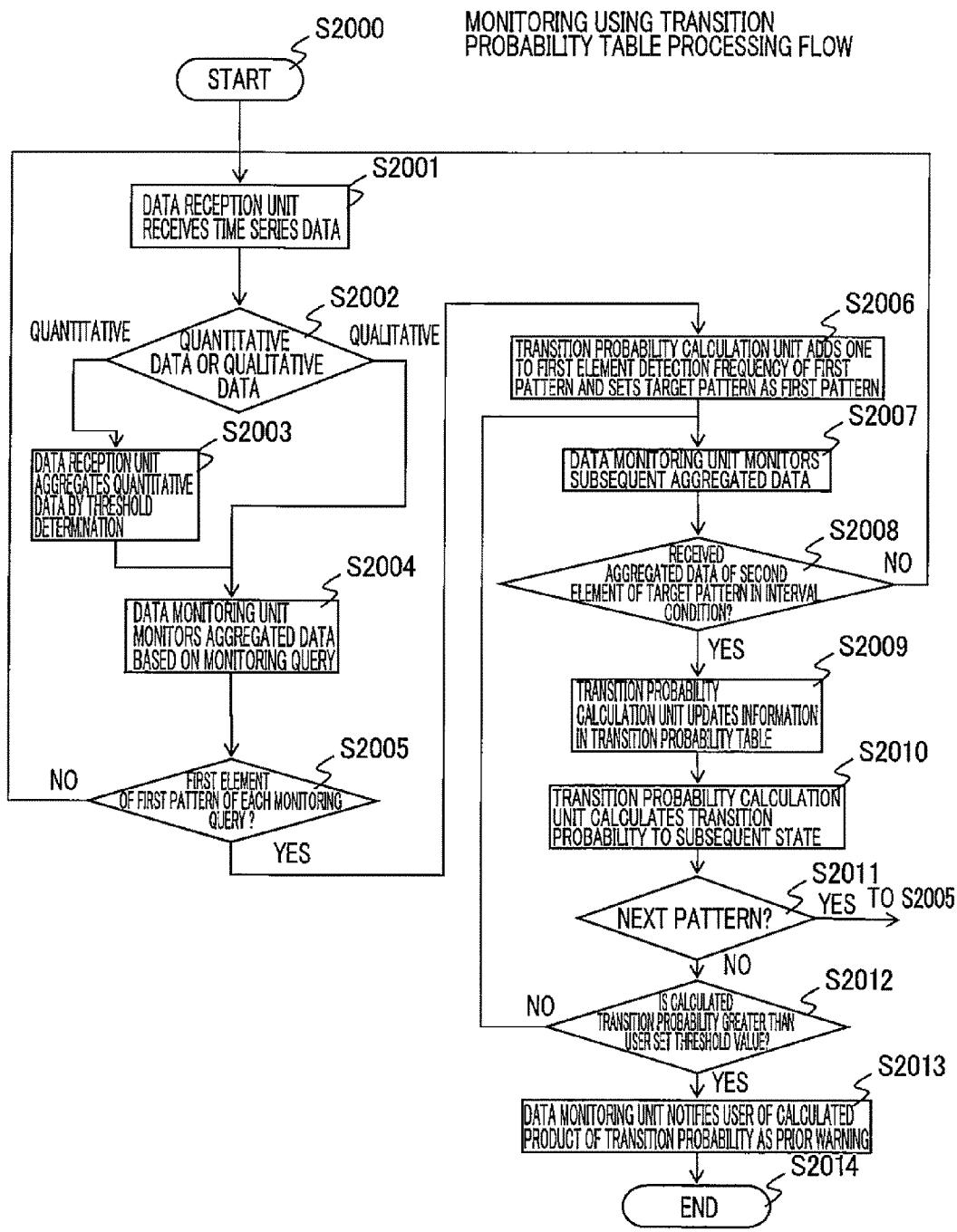
FIG. 22 is a flowchart for illustrating an example of the time series data monitoring process using the transition probability table in embodiment 3.

Next, a description of the monitoring process using the transition probability table 1250 in the present embodiment is given. The monitoring process using the transition probability table 1250 achieves detection of a prior warning of such as an occurrence of an abnormal event in the controlling and monitoring target system 300 using the transition probability table 1250 created by the process example of FIG. 21. FIG. 22 shows an example of a monitoring process using the transition probability table 1250. The monitoring process of FIG. 22 is started upon input of an instruction to execute the monitoring process from, for example, the client computer 400 or the input/output device 150 (S2000). Alternatively, the process may be started upon reception of time series data from the controlling and monitoring target system 300 by the data reception unit 1221 of the time series data processing device 100.

When the monitoring process of FIG. 22 is started at S2000, first the data reception unit 1221 receives time series data form the controlling and monitoring target system 300 (S2001). The data reception unit 1221 determines whether the received time series data is quantitative data or qualitative data (S2002) and when determining to be quantitative data (S2002, QUANTITATIVE), the data reception unit 1221 aggregates the quantitative data using the threshold value defined in the aggregated data table 210 (S2003). When determining to be qualitative data at S2002 (S2002, QUALITATIVE), the data reception unit 1221 proceeds to S2004 as is.

At S2004, the data monitoring unit 1223 monitors aggregated data based on the monitoring query 1251 stored in the transition probability table 1250 (S2004). The data monitoring unit 1223 determines whether the monitoring target is the first element of the first pattern 1252 for each of the monitoring queries 1251 (S2005), and when determined to be the first element of the first pattern 1252 (S2005, YES) the data monitoring unit 1223 proceeds to S2006. When determined not to be the first element of the first pattern 1252 (S2005, NO) the data monitoring unit 1223 waits to receive the next time series data at S2001.

At S2006, the transition probability calculation unit 12223 increments by one the value of the first element detection frequency 12521 of the first pattern in the transition probability table 1250 and sets the target pattern as the first pattern. Subsequently, the data monitoring unit 1223 monitors the subsequent aggregated data (S2007) and determines whether aggregated data matching the second element of the target pattern in the interval condition set to the corresponding monitoring query 1251 has been received (S2008). When determining that aggregated data matching the second element of the target pattern in the interval condition has been received (S2008, YES), the data monitoring unit 1223 proceeds to S2009. When determining that aggregated data matching the second element of the target pattern in the interval condition has not been received (S2008, NO), the data monitoring unit 1223 waits to receive the next time series data at S2001.

At S2009, the transition probability calculation unit 12223 increments by one the value of the second element transition frequency 12522 recorded in the transition probability table 1250 (S2009) and calculates the transition probability for transition from the first element to the second element of the first pattern for recording in the transition probability table 1250 (S2010). Subsequently, the data monitoring unit 1223 determines from the transition probability table 1250 whether the next pattern is recorded for the monitoring query 1251 as the processing target (S2011) and when determining that the next pattern is recorded (S2011, YES), the process returns to S2006 to perform transition probability calculation for the next pattern. In this case, the first pattern in FIG. 22 is to be read as the second pattern, the third pattern, and so on.

When determining that there is no next pattern recorded (S2011, NO) for the monitoring query 1251 as the processing target, the data monitoring unit 1223 calculates the product of the transition probability of each calculated pattern and determines whether the value exceeds a user-set threshold (S2012). When determining that the value does not exceed the user-set threshold (S2012, NO), the data monitoring unit 1223 returns to S2001 and waits to receive the next time series data. When determining that the value exceeds the user-set threshold (S2012, YES), the data monitoring unit 1223 notifies the user through the client computer 400 or the input/output device 150 the value of the product of the transition probability calculated in the processes up to S2012 as a prior warning of an event suggested by the monitoring query of the processing target (S2013) and ends the present process (S2014).

According to the above-described time series data monitoring process using the transition probability table, the occurrence of foreseeable abnormal events and the like in the controlling and monitoring target system 300 can be detected accurately based on the probability of occurrence pattern of specific time series data.

Although embodiments have been described hereinabove, the embodiments are for the purpose of facilitating an understanding of the present invention, and are not intended to limit the interpretation of the present invention. The present invention can be altered and modified without departing from the scope of the present invention and also includes equivalents thereof.

The invention claimed is:

1. A time series data processing device, comprising:
a hardware processor coupled to a memory and a communication interface circuit, the hardware processor configured to:
receive, from a system comprising one or more sensors and that is a processing target, time series data that is a sequence of data via a communication network;
receive, with respect to details of the time series data and occurrence time information, a first time series data search condition including events of a plurality of the time series data and an interval condition that is a condition of time intervals of the events occurring, and change the interval condition using an allowable time lag that is allowable time of a set time lag in a transmission source of the time series data to reflect the set time lag in the first time series data search condition; and
monitor the time series data received from the system that is the processing target, using the first time series data search condition including the changed interval condition, and
wherein the interval condition of the first time series data search condition includes a maximum value and a minimum value of a time interval for a plurality of the events that occur, and the hardware processor is further configured to generate a second time series data search condition by rearranging an occurrence sequence of the plurality of the events when determining that a value of the set allowable time lag is greater than the minimum value.

2. The time series data processing device according to claim 1, wherein information reflecting set time lag and indicating that a search has been made taking set time lag into consideration is added to a sequence of the time series data determined to match the first time series data search condition reflecting the set time lag.

3. The time series data processing device according to claim 1, wherein a predetermined monitoring target range is applied to limit the time series data as a monitoring target.

4. The time series data processing device according to claim 3, wherein the predetermined monitoring target range is set in time units in which the time series data belong or in lot units attached to the time series data.

5. The time series data processing device according to claim 1, wherein the hardware processor is further configured to collect the set time lag value for each transmission source of the time series data of the processing target system and calculate the allowable set time lag for each of the transmission source based on a maximum value of the set time lag collected, to determine the allowable set time lag of the time series data.

6. The time series data processing device according to claim 1, wherein the hardware processor is further configured to sequentially calculate, for the first time series data search condition, a probability of occurrence of a second event occurring after a first event included in the first time series data search condition while satisfying the predetermined interval condition, and output a notification that warns of an occurrence of an event predicted by the first time series data search condition when a last occurrence probability obtained is determined to exceed a predetermined occurrence probability threshold.

7. A time series data processing method comprising:
receiving, by a time series data processing device comprising a hardware processor, a memory, and a communication interface circuit, via a communication network from a system comprising one or more sensors and that is a processing target, time series data that is a sequence of data;
receiving, with respect to details of the time series data and occurrence time information, a first time series data search condition including events of a plurality of the time series data and an interval condition that is a condition of time intervals of the events occurring, and reflecting a set time lag in the first time series data search condition by changing the interval condition using an allowable time lag that is allowable time of the set time lag in a transmission source of the time series data; and
monitoring the time series data received from a system that is the processing target, using the first time series data search condition including the changed interval condition, and
wherein the interval condition of the first time series data search condition includes a maximum value and a minimum value of a time interval of a plurality of the events that occur, and the method further comprises generating a second time series data search condition by rearranging an occurrence sequence of the plurality of the events when determining that a value of the set allowable time lag is greater than the minimum value.

8. The time series data processing method according to claim 7, wherein information reflecting set time lag and indicating that a search has been made taking set time lag into consideration is added to a sequence of the time series data determined to match the first time series data search condition reflecting the set time lag.

9. The time series data processing method according to claim 7, wherein a predetermined monitoring target range is applied to limit the time series data as a monitoring target.

10. The time series data processing method according to claim 9, wherein the predetermined monitoring target range is set in time units in which the time series data belong or in lot units attached to the time series data.

11. The time series data processing method according to claim 7, wherein the set time lag value for each transmission source of the time series data of the processing target system is collected and the allowable set time lag for each of the transmission sources based on a maximum value of the set time lag collected is calculated to determine the allowable set time lag of the time series data.

12. The time series data processing method according to claim 7, wherein, with respect to the first time series data search condition, a probability of occurrence of a second event occurring after a first event included in the first time series data search condition while satisfying the interval condition predetermined is sequentially calculated, and a notification that warns of an occurrence of an event predicted by the first time series data search condition is output when a last occurrence probability obtained is determined to exceed a predetermined occurrence probability threshold.

13. A non-transitory computer-readable medium storing a time series data processing program, the time series data processing program when executed by a processor that is coupled to a memory and a communication interface circuit, causing the processor to perform operations comprising:

receiving, from a system comprising one or more sensors and that is a processing target, time series data that is a sequence of data via a communication network;

receiving, with respect to details of the time series data and occurrence time information, a first time series data search condition including events of a plurality of the time series data and an interval condition that is a condition of time intervals of the events occurring, and reflecting a set time lag in the first time series data search condition by changing the interval condition using an allowable time lag that is allowable time of the set time lag in a transmission source of the time series data; and monitoring the time series data received from the system that is the processing target, using the first time series data search condition including the changed interval condition, and wherein the interval condition of the first time series data search condition includes a maximum value and a minimum value of a time interval of a plurality of the events that occur, and the processor is further caused to perform operations comprising generating a second time series data search condition by rearranging an occurrence sequence of the plurality of the events when determining that a value of the set allowable time lag is greater than the minimum value.

* * * * *